United States Patent
Jensen et al.

(10) Patent No.: US 6,421,445 B1
(45) Date of Patent: Jul. 16, 2002

(54) APPARATUS AND METHODS FOR INCLUDING CODES IN AUDIO SIGNALS

(75) Inventors: James M. Jensen, Columbia; Wendell D. Lynch, Silver Spring; Michael M. Perelshteyn, Gaithersburg; Robert B. Graybill, Woodstock; Sayed Hassan, Clarksville; Wayne Sabin, Baldwin, all of MD (US)

(73) Assignee: Arbitron Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/328,766

(22) Filed: Jun. 8, 1998

Related U.S. Application Data

(60) Division of application No. 08/408,010, filed on Mar. 24, 1995, now Pat. No. 5,764,763, which is a continuation-in-part of application No. 08/221,019, filed on Mar. 31, 1994, now Pat. No. 5,450,490.

(51) Int. Cl.[7] .................. H04L 9/00; H04N 7/025
(52) U.S. Cl. ............. 380/253; 380/241; 380/275; 725/18
(58) Field of Search .................. 380/252, 253, 380/254; 713/176

Primary Examiner—Gilberto Barron, Jr.
(74) Attorney, Agent, or Firm—St. Onge Steward Johnston & Reens; Eugene L. Flanagan, III

(57) ABSTRACT

Apparatus and methods for including a code having at least one code frequency component in an audio signal are provided. The abilities of various frequency components in the audio signal to mask the code frequency component to human hearing are evaluated and based on these evaluations an amplitude is assigned to the code frequency component. Methods and apparatus for detecting a code in an encoded audio signal are also provided. A code frequency component in the encoded audio signal is detected based on an expected code amplitude or on a noise amplitude within a range of audio frequencies including the frequency of the code component.

8 Claims, 23 Drawing Sheets

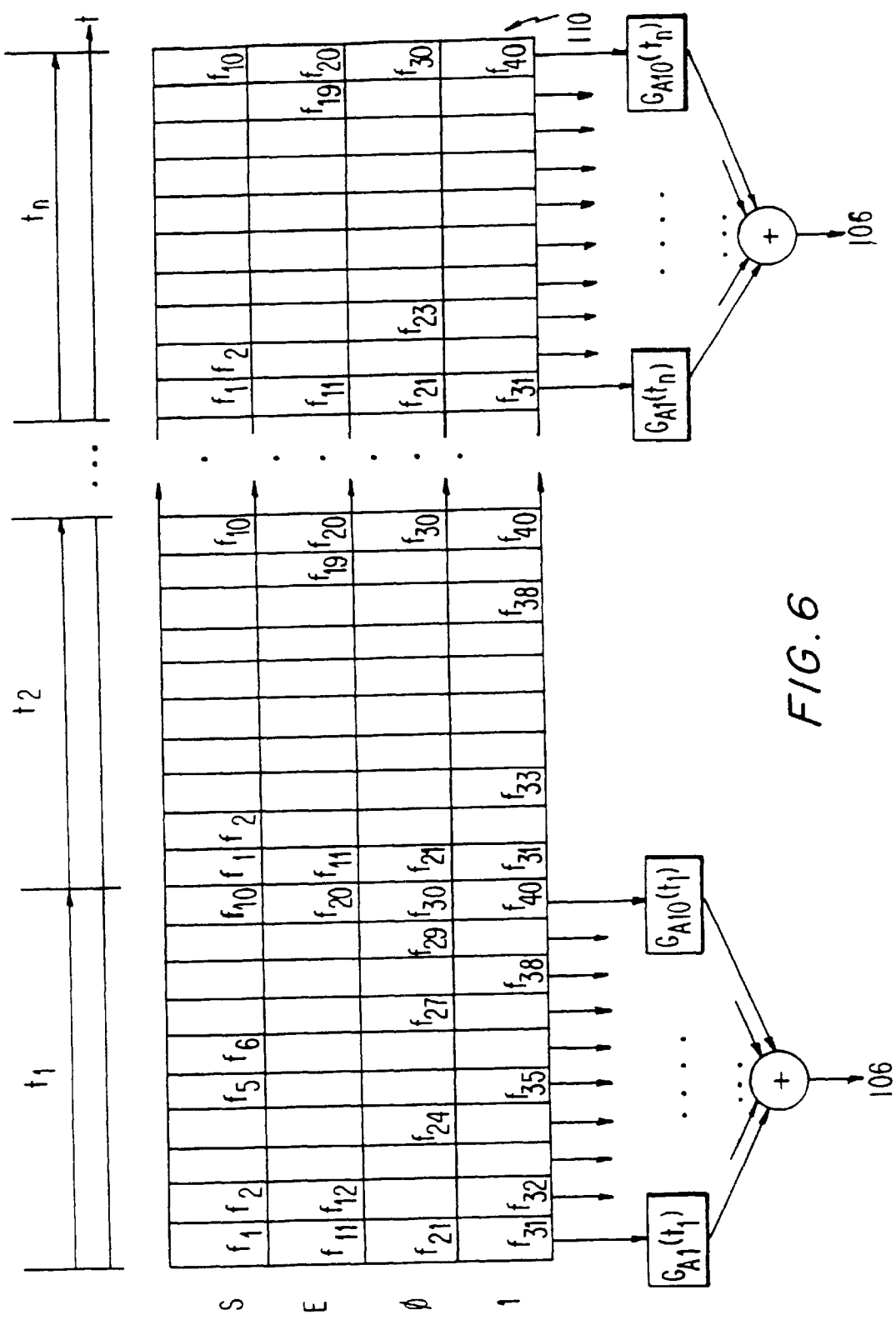

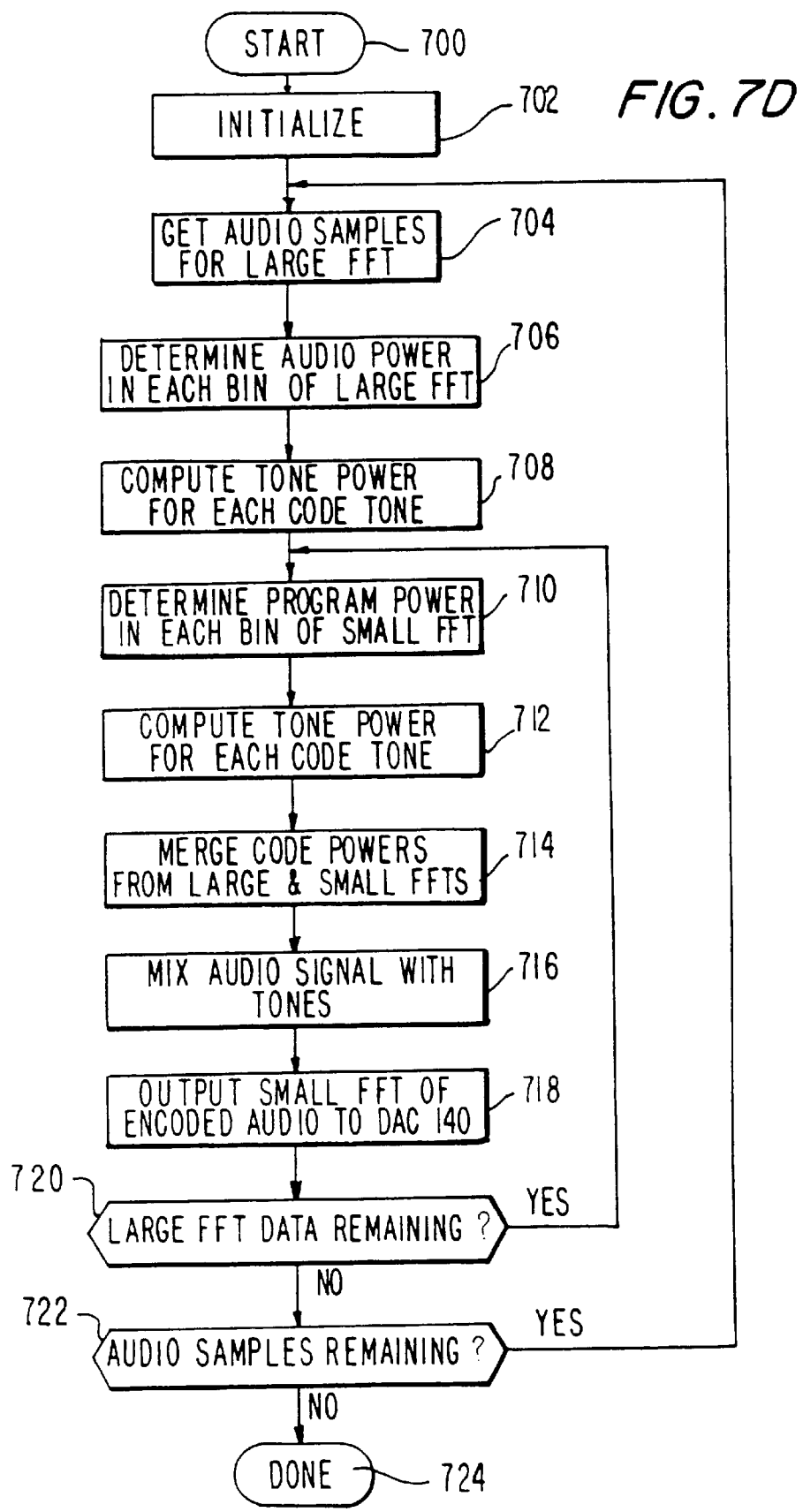

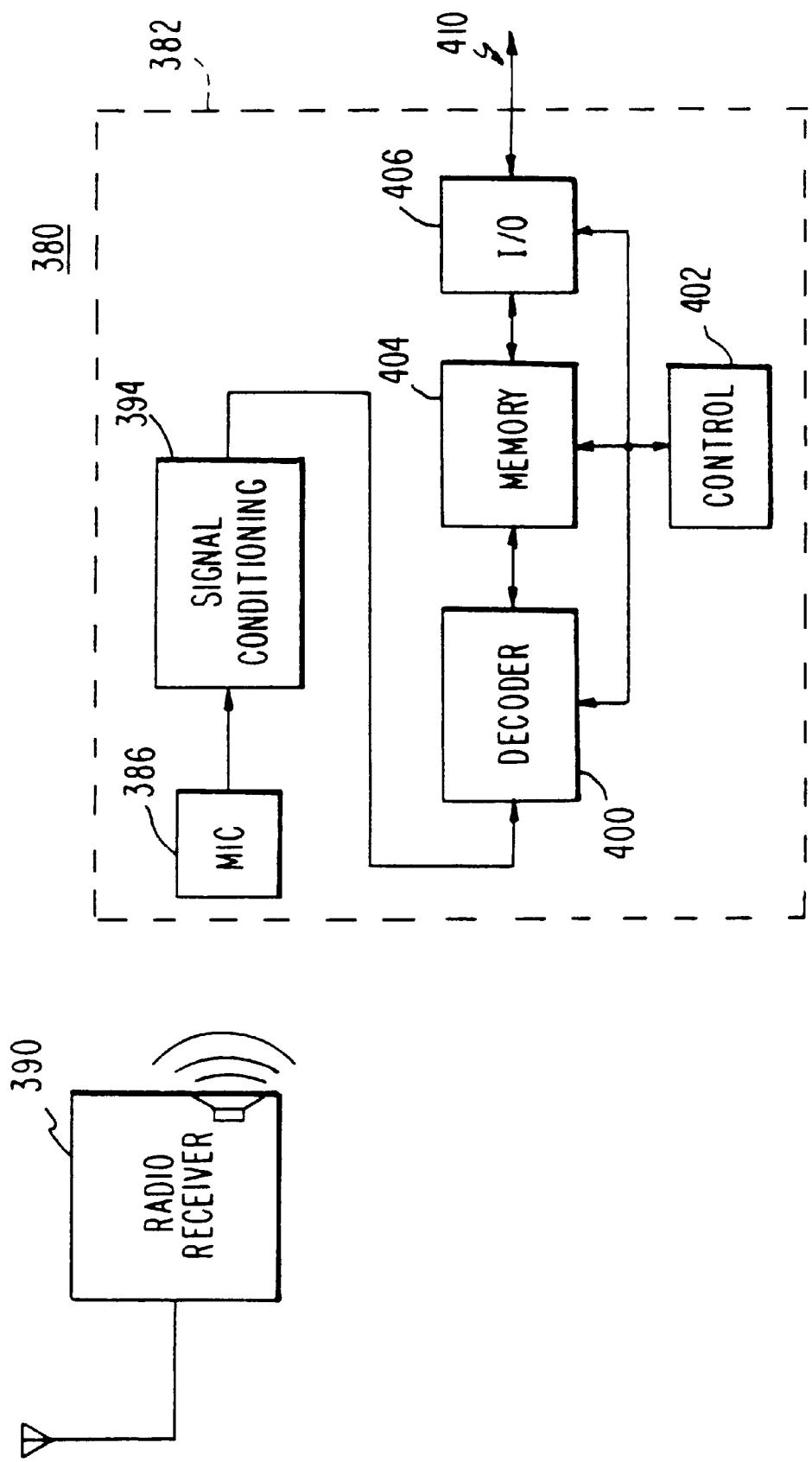

APPARATUS AND METHODS FOR INCLUDING CODES IN AUDIO SIGNALS

This application is a division of application Ser. No. 08/408,010 filed Mar. 24, 1995, now U.S. Pat. No. 5,764,763 issued Jun. 9, 1998, which is a continuation-in-part of application Ser. No. 08/221,019 filed Mar. 31, 1994, now U.S. Pat. No. 5,450,490 issued Sep. 12, 1995.

BACKGROUND OF THE INVENTION

The present invention relates to apparatus and methods for including codes in audio signals and decoding such codes.

For many years, techniques have been proposed for mixing codes with audio signals so that (1) the codes can be reliably reproduced from the audio signals, while (2) the codes are inaudible when the audio signals are reproduced as sound. The accomplishment of both objectives is essential for practical application. For example, broadcasters and producers of broadcast programs, as well as those who record music for public distribution will not tolerate the inclusion of audible codes in their programs and recordings.

Techniques for encoding audio signals have been proposed at various times going back at least to U.S. Pat. No. 3,004,104 to Hembrooke issued Oct. 10, 1961. Hembrooke showed an encoding method in which audio signal energy within a narrow frequency band was selectively removed to encode the signal. A problem with this technique arises when noise or signal distortion reintroduces energy into the narrow frequency band so that the code is obscured.

In another method, U.S. Pat. No. 3,845,391 to Crosby proposed to eliminate a narrow frequency band from the audio signal and insert a code therein. This technique evidently encountered the same problems as Hembrooke, as recounted in U.S. Pat. No. 4,703,476 to Howard which, as indicated thereon, was commonly assigned with the Crosby patent. However, the Howard patent sought only to improve Crosby's method without departing from its fundamental approach.

It has also been proposed to encode binary signals by spreading the binary codes into frequencies extending throughout the audio band. A problem with this proposed method is that, in the absence of audio signal components to mask the code frequencies, they can become audible. This method, therefore, relies on the asserted noiselike character of the codes to suggest that their presence will be ignored by listeners. However, in many cases this assumption may not be valid, for example, in the case of classical music including portions with relatively little audio signal content or during pauses in speech.

A further technique has been suggested in which dual tone multifrequency (DTMF) codes are inserted in an audio signal. The DTMF codes are purportedly detected based on their frequencies and durations. However, audio signal components can be mistaken for one or both tones of each DTMF code, so that either the presence of a code can be missed by the detector or signal components can be mistaken for a DTMF code. It is noted in addition that each DTMF code includes a tone common to another DTMF code. Accordingly, a signal component corresponding to a tone of a different DTMF code can combine with the tone of a DTMF code which is simultaneously present in the signal to result in a false detection.

OBJECTS AND SUMMARY OF THE INVENTION

Accordingly, it is an object of the present invention to provide coding and decoding apparatus and methods which overcome the disadvantages of the foregoing proposed techniques.

It is a further object of the present invention to provide coding apparatus and methods for including codes with audio signals so that, as sound, the codes are inaudible to the human ear but can be detected reliably by decoding apparatus.

A further object of the present invention is to provide decoding apparatus and methods for reliably recovering codes present in audio signals.

In accordance with a first aspect of the present invention, apparatus and methods for including a code having at least one code frequency component with an audio signal having a plurality of audio signal frequency components, comprise the means for and the steps of: evaluating an ability of a first set of the plurality of audio signal frequency components to mask the at least one code frequency component to human hearing to produce a first masking evaluation; evaluating an ability of a second set of the plurality of audio signal frequency components differing from the first set thereof to mask the at least one code frequency component to human hearing to produce a second masking evaluation; assigning an amplitude to the at least one code frequency component based on a selected one of the first and second masking evaluations; and including the at least one code frequency component with the audio signal.

In accordance with another aspect of the present invention, an apparatus for including a code having at least one code frequency component with an audio signal having a plurality of audio signal frequency components, comprises: a digital computer having an input for receiving the audio signal, the digital computer being programmed to evaluate respective abilities of first and second sets of the plurality of audio signal frequency components to mask the at least one code frequency component to human hearing to produce respective first and second masking evaluations, the second set of the plurality of audio signal frequency components differing from the first set thereof, the digital computer being further programmed to assign an amplitude to the at least one code frequency component based on a selected one of the first and second masking evaluations; and means for including the at least one code frequency component with the audio signal.

In accordance with a further aspect of the present invention, apparatus and methods for including a code having a plurality of code frequency components with an audio signal having a plurality of audio signal frequency components, the plurality of code frequency components including a first code frequency component having a first frequency and a second code frequency component having a second frequency different from the first frequency, comprise the means for and the steps of, respectively: evaluating an ability of at least one of the plurality of audio signal frequency components to mask a code frequency component having the first frequency to human hearing to produce a first respective masking evaluation; evaluating an ability of at least one of the plurality of audio signal frequency components to mask a code frequency component having the second frequency to human hearing to produce a second respective masking evaluation; assigning a respective amplitude to the first code frequency component based on the first respective masking evaluation and assigning a respective amplitude to the second code frequency component based on the second respective masking evaluation; and including the plurality of code frequency components with the audio signal.

In accordance with yet another aspect of the present invention, an apparatus for including a code having a plurality of code frequency components with an audio signal having a plurality of audio signal frequency components, the plurality of code frequency components including a first code frequency component having a first frequency and a second code frequency component having a second code frequency different from the first frequency, comprises: a digital computer having an input for receiving the audio signal, the digital computer being programmed to evaluate an ability of at least one of the plurality of audio signal frequency components to mask a cods frequency component having the first frequency to human hearing to produce a first respective masking evaluation and to evaluate an ability of at least one of the plurality of audio signal frequency components to mask a code frequency component having the second frequency to human hearing to produce a second respective masking evaluation; the digital computer being further programmed to assign a corresponding amplitude to the first code frequency component based on the first respective masking evaluation and to assign a corresponding amplitude to the second code frequency component based on the second respective masking evaluation; and means for including the plurality of code frequency components with the audio signal.

In accordance with a still further aspect of the present invention, apparatus and methods for including a code having at least one code frequency component with an audio signal including a plurality of audio signal frequency components, comprise the means for and the steps of, respectively: evaluating an ability of at least one of the plurality of audio signal frequency components within a first audio signal interval on a time scale of the audio signal when reproduced as sound during a corresponding first time interval to mask the at least one code frequency component to human hearing when reproduced as sound during a second time interval corresponding to a second audio signal interval offset from the first audio signal interval to produce a first masking evaluation; assigning an amplitude to the at least one code frequency component based on the first masking evaluation; and including the at least one code frequency component in a portion of the audio signal within the second audio signal interval.

In accordance with yet still another aspect of the present invention, an apparatus for including a code having at least one code frequency component with an audio signal including a plurality of audio signal frequency components, comprises: a digital computer having an input for receiving the audio signal, the digital computer being programmed to evaluate an ability of at least one of the plurality of audio signal frequency components within a first audio signal interval on a time scale of the audio signal when reproduced as sound during a corresponding first time interval to mask the at least one code frequency component to human hearing when reproduced as sound during a second time interval corresponding to a second audio signal interval offset from the first audio signal interval, to produce a first masking evaluation; the digital computer being further programmed to assign an amplitude to the at least one code frequency component based on the first masking evaluation; and means for including the at least one code frequency component in a portion of the audio signal within the second audio signal interval.

In accordance with a still further aspect of the present invention, apparatus and methods for including a code having at least one code frequency component with an audio signal having a plurality of audio signal frequency components, comprise the means for and the steps of, respectively: producing a first tonal signal representing substantially a first single one of the plurality of audio signal frequency components; evaluating an ability of the first single one of the plurality of audio signal frequency components to mask the at least one code frequency component to human hearing based on the first tonal signal to produce a first masking evaluation; assigning an amplitude to the at least one code frequency component based on the first masking evaluation; and including the at least one code frequency component with the audio signal.

In accordance with another aspect of the present invention, an apparatus for including a code having at least one code frequency component with an audio signal having a plurality of audio signal frequency components, comprises: a digital computer having an input for receiving the audio signal, the digital computer being programmed to produce a first tonal signal representing substantially a first single one of the plurality of audio signal frequency components and to evaluate an ability of the first single one of the plurality of audio signal frequency components to mask the at least one code frequency component to human hearing based on the first tonal signal to produce a first masking evaluation; the digital computer being further programmed to assign an amplitude to the at least one code frequency component based on the first masking evaluation; and means for including the at least one code frequency component with the audio signal.

In accordance with yet still another aspect of the present invention, apparatus and methods for detecting a code in an encoded audio signal, the encoded audio signal including a plurality of audio frequency signal components and at least one code frequency component having an amplitude and an audio frequency selected for masking the code frequency component to human hearing by at least one of the plurality of audio frequency signal components, comprise the means for and the steps of, respectively: establishing an expected code amplitude of the at least one code frequency component based on the encoded audio signal; and detecting the code frequency component in the encoded audio signal based on the expected code amplitude thereof.

In accordance with a yet still further aspect of the present invention, a programmed digital computer is provided for detecting a code in an encoded audio signal, the encoded audio signal including a plurality of audio frequency signal components and at least one code frequency component having an amplitude and an audio frequency selected for masking the code frequency component to human hearing by at least ones of the plurality of audio frequency signal components, the digital computer comprising: an input for receiving the encoded audio signal; a processor programmed to establish an expected code amplitude of the at least one code frequency component based on the encoded audio signal, to detect the code frequency component in the encoded audio signal based on the expected code amplitude and to produce a detected code output signal based on the detected code frequency component; and an output coupled with the processor for providing the detected code output signal.

In accordance with another aspect of the present invention, apparatus and methods are provided for detecting a code in an encoded audio signal, the encoded audio signal having a plurality of frequency components including a plurality of audio frequency signal components and at least one code frequency component having a predetermined audio frequency and a predetermined amplitude for distinguishing the at least one code frequency component from the plurality of audio frequency signal components, comprise the means for and the steps of, respectively: determining an amplitude of a frequency component of the encoded audio signal within a first range of audio frequencies including the predetermined audio frequency of the at least one code frequency component; establishing a noise amplitude for the first range of audio frequencies; and detecting the presence of the at least one code frequency component in the first range of audio frequencies based on the established noise amplitude thereof and the determined amplitude of the frequency component therein.

In accordance with a further aspect of the present invention, a digital computer is provided for detecting a code in an encoded audio signal, the encoded audio signal having a plurality of frequency components including a plurality of audio frequency signal components and at least one code frequency component having a predetermined audio frequency and a predetermined amplitude for distinguishing the at least one code frequency component from the plurality of audio frequency signal components, comprising: an input for receiving the encoded audio signal; a processor coupled with the input to receive the encoded audio signal and programmed to determine an amplitude of a frequency component of the encoded audio signal within a first range of audio frequencies including the predetermined audio frequency of the at least one code frequency component; the processor being further programmed to establish a noise amplitude for the first range of audio frequencies and to detect the presence of the at least one code frequency component in the first range of audio frequencies based on the established noise amplitude thereof and the determined amplitude of the frequency component therein; the processor being operative to produce a code output signal based on the detected presence of the at least one code frequency component; and an output terminal coupled with the processor to provide the code signal thereat.

In accordance with yet a further aspect of the present invention, apparatus and methods are provided for encoding an audio signal, comprise the means for and the steps of, respectively: generating a code comprising a plurality of code frequency component sets, each of the code frequency component sets representing a respectively different code symbol and including a plurality of respectively different code frequency components, the code frequency components of the code frequency component sets forming component clusters spaced from one another within the frequency domain, each of the component clusters having a respective predetermined frequency range and consisting of one frequency component from each of the code frequency component sets falling within its respective predetermined frequency range, component clusters which are adjacent within the frequency domain being separated by respective frequency amounts, the predetermined frequency range of each respective component cluster being smaller than the frequency amounts separating the respective component cluster from its adjacent component clusters; and combining the code with the audio signal.

In accordance with yet still another aspect of the present invention, a digital computer is provided for encoding an audio signal, comprising: an input for receiving the audio signal, a processor programmed to produce a code comprising a plurality of code frequency component sets, each of the code frequency component sets representing a respectively different code symbol and including a plurality of respectively different code frequency components, the code frequency components of the code frequency component sets forming component clusters spaced from one another within the frequency domain, each of the component clusters having a respective predetermined frequency range and consisting of one frequency component from each of the code frequency component sets falling within its respective predetermined frequency range, component clusters which are adjacent within the frequency domain being separated by respective frequency amounts, the predetermined frequency range of each respective component cluster being smaller than the frequency amounts separating the respective component cluster from its adjacent component clusters; and means for combining the code with the audio signal.

The above, and other objects, features and advantages of the invention, will be apparent in the following detailed description of certain advantageous embodiments thereof which is to be read in connection with the accompanying drawings forming a part hereof, and wherein corresponding elements are identified by the same reference numerals in the several views of the drawings.

BRIEF DESCRIPTION OF THE DRAWINGS

FIGS. 5 and 6 are functional block diagrams for use in illustrating the operation of the embodiment of FIG. 3;

FIGS. 7D and 7E are flow charts for illustrating an alternative software routine employed in the embodiment of FIG. 3;

FIGS. 16 and 17 are block diagrams of apparatus in accordance with an embodiment of the present invention incorporated in a system for producing estimates of audiences for widely disseminated information.

DETAILED DESCRIPTION OF CERTAIN ADVANTAGEOUS EMBODIMENTS

Encoding

The present invention implements techniques for including codes in audio signals in order to optimize the probability of accurately recovering the information in the codes from the signals, while ensuring that the codes are inaudible to the human ear when the encoded audio is reproduced as sound ever. if the frequencies of the codes fall within the audible frequency range.

Figure 1:
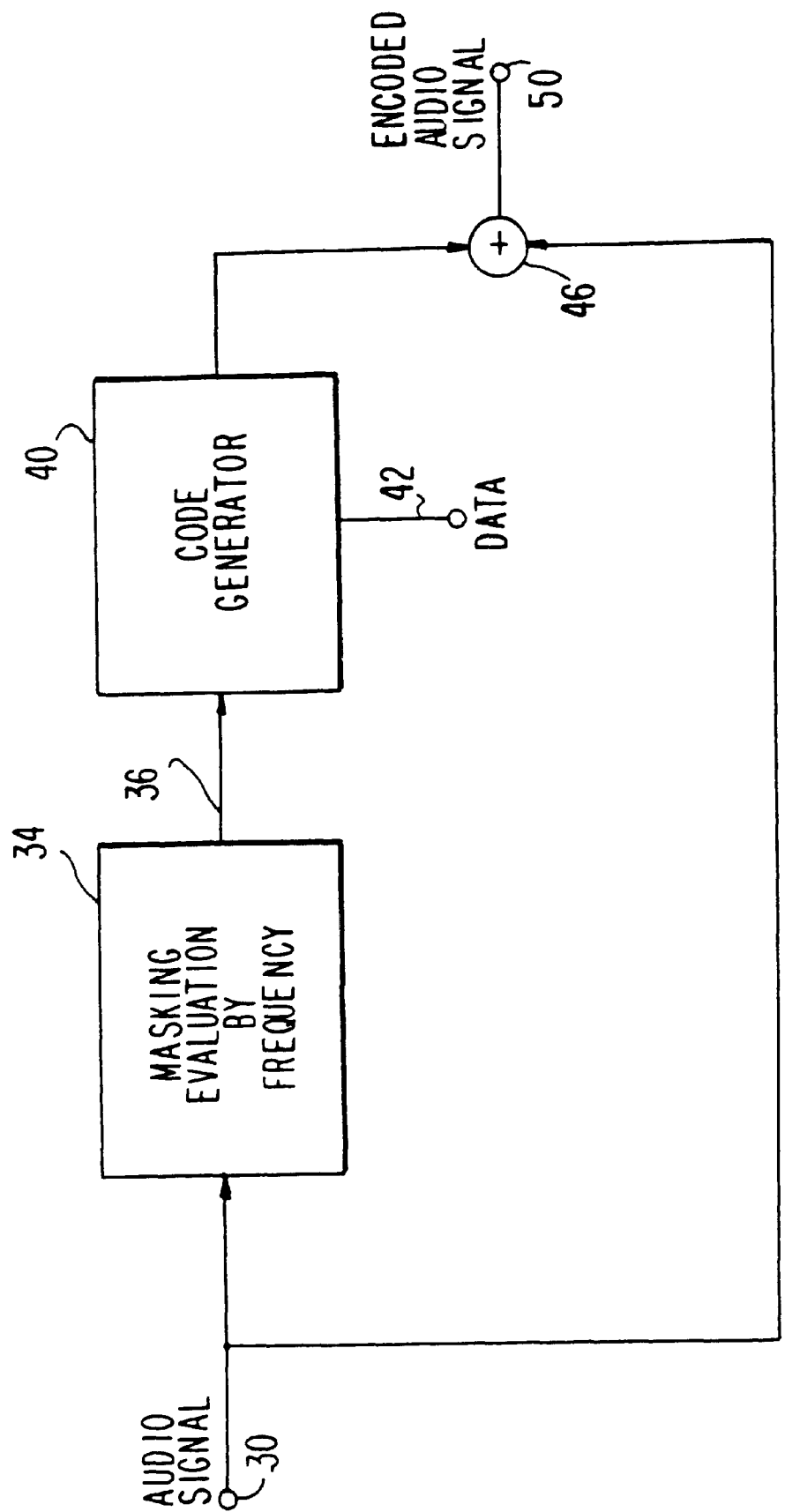
FIG. 1 is a functional block diagram of an encoder in accordance with an aspect of the present invention.

With reference first to FIG. 1, a functional block diagram of an encoder in accordance with an aspect of the present invention is illustrated therein. An audio signal to be encoded is received at an input terminal 30. The audio signal may represent, for example, a program to be broadcast by radio, the audio portion of a television broadcast, or a musical composition or other kind of audio signal to be recorded in some fashion. Moreover, the audio signal may be a private communication, such as a telephone transmission, or a personal recording of some sort. However, these are examples of the applicability of the present invention and there is no intention to limit its scope by providing such examples.

As indicated by the functional block 34 in FIG. 1, the ability of one or more components of the received audio signal to mask sounds having frequencies corresponding with those of the code frequency component or components to be added to the audio signal is evaluated. Multiple evaluations may be carried out for a single code frequency, a separate evaluation for each of a plurality of code frequencies may be carried out, multiple evaluations for each of a plurality of code frequencies may be effected, one or more common evaluations for multiple code frequencies may be carried out or a combination of one or more of the foregoing may be implemented. Each evaluation is carried out based on the frequency of the one or more code components to be masked and the frequency or frequencies of the audio signal component or components whose masking abilities are being evaluated. In addition, if the code component and the masking audio component or components do not fall within substantially simultaneous signal intervals, such that they would be reproduced as sound at significantly different time intervals, the effects of differences in signal intervals between the code component or components being masked and the masking program component or components are also to be taken into consideration.

Advantageously, in certain embodiments multiple evaluations are carried out for each code component by separately considering the abilities of different portions of the audio signal to mask each code component. In one embodiment, the ability of each of a plurality of substantially single tone audio signal components to mask a code component is evaluated based on the frequency of the audio signal component, its "amplitude" (as defined herein) and timing relevant to the code component, such masking being referred to herein as "tonal masking".

The term "amplitude" is used herein to refer to any signal value or values which may be employed to evaluate masking ability, to select the size of a code component, to detect its presence in a reproduced signal, or as otherwise used, including values such as signal energy, power, voltage, current, intensity and pressure, whether measured on an absolute or relative basis, and whether measured on an instantaneous or accumulated basis. As appropriate, amplitude may be measured as a windowed average, an arithmetic average, by integration, as a root-mean-square value, as an accumulation of absolute or relative discrete values, or otherwise.

In other embodiments, in addition to tonal masking evaluations or in the alternative, the ability of audio signal components within a relatively narrow band of frequencies sufficiently near a given code component to mask the component is evaluated (referred to herein as "narrow band" masking). In still other embodiments, the ability of multiple code components within a relatively broad band of frequencies to mask the component is evaluated. As necessary or appropriate, the abilities of program audio components in signal intervals preceding or following a given component or components to mask the same on a non-simultaneous basis are evaluated. This manner of evaluation is particularly useful where audio signal components in a given signal interval have insufficiently large amplitudes to permit the inclusion of code components of sufficiently large amplitudes in the same signal interval so that they are distinguishable from noise.

Preferably, a combination of two or more tonal masking abilities, narrow band masking abilities and broadband masking abilities (and, as necessary or appropriate, non-simultaneous masking abilities), are evaluated for multiple code components. Where code components are sufficiently close in frequency, separate evaluations need not be carried out for each.

In certain other advantageous embodiments, a sliding tonal analysis is carried out instead of separate tonal, narrow band and broadband analyses, avoiding the need to classify the program audio as tonal, narrow band or broadband.

Preferably, where a combination of masking abilities are evaluated, each evaluation provides a maximum allowable amplitude for one or more code components, so that by comparing all of the evaluations that have been carried out and which relate to a given component, a maximum amplitude may be selected therefor which will ensure that each component will nevertheless be masked by the audio signal when it is reproduced as sound so that all of the components become inaudible to human hearing. By maximizing the amplitude of each component, the probability of detecting its presence based on its amplitude, is likewise maximized. Of course, it is not essential that the maximum possible amplitude be employed, as it is only necessary when decoding to be able to distinguish a sufficiently large number of code components from audio signal components and other noise.

The results of the evaluations are output as indicated at 36 in FIG. 1 and made available to a code generator 40. Code generation may be carried out in any of a variety of different ways. One particularly advantageous technique assigns a unique set of code frequency components to each of a plurality of data states or symbols, so that, during a given signal interval, a corresponding data state is represented by the presence of its respective set of code frequency components. In this manner, interference with code detection by audio signal components is reduced since, in an advantageously high percentage of signal intervals, a sufficiently large number of code components will be detectable despite program audio signal interference with the detection of other components. Moreover, the process of implementing the masking evaluations is simplified where the frequencies of the code components are known before they are generated.

Other forms of encoding may also be implemented. For example, frequency shift keying (FSK), frequency modulation (FM), frequency hopping, spread spectrum encoding, as well as combinations of the foregoing can be employed. Still other encoding techniques which may be used in practicing the present invention will be apparent from its disclosure herein.

The data to be encoded is received at an input 42 of the code generator 40 which responds by producing its unique group of code frequency components and assigning an amplitude to each based upon the evaluations received from the output 36. The code frequency components as thus produced are supplied to a first input of a summing circuit 46 which receives the audio signal to be encoded at a second input. The circuit 46 adds the code frequency components to the audio signal and outputs an encoded audio signal at an output terminal 50. The circuit 46 may be either an analog or digital summing circuit, depending on the form of the signals supplied thereto. The summing function may also be implemented by software and, if so, a digital processor used to carry out the masking evaluation and to produce the code can also be used to sum the code with the audio signal. In one embodiment, the code is supplied as time domain data in digital form which is then summed with time domain audio data. In another, the audio signal is converted to the frequency domain in digital form and added to the code which likewise is represented as digital frequency domain data. In most applications, the summed frequency domain data is then converted to time domain data.

From the following, it will be seen that masking evaluation as well as code producing functions may be carried out either by digital or analog processing, or by combinations of digital and analog processing. In addition, while the audio signal may be received in analog form at the input terminal 30 and added to the code components in analog form by the circuit 46 as shown in FIG. 1, in the alternative, the audio signal may be converted to digital form when it is received, added to the code components in digital form and output in either digital or analog form. For example, when the signal is to be recorded on a compact disk or on a digital audio tape, it may be output in digital form, whereas if it is to be broadcast by conventional radio or television broadcasting techniques, it may be output in analog form. Various other combinations of analog and digital processing may also be implemented.

In certain embodiments, the code components of only one code symbol at a time are included in the audio signal. However, in other embodiments, the components of multiple code symbols are included simultaneously in the audio signal. For example, in certain embodiments the components of one symbol occupy one frequency band and those of another occupy a second frequency band simultaneously. In the alternative, the components of one symbol can reside in the same band as another or in an overlapping band, so long as their components are distinguishable, for example, by assigning to respectively different frequencies or frequency intervals.

Figure 2:
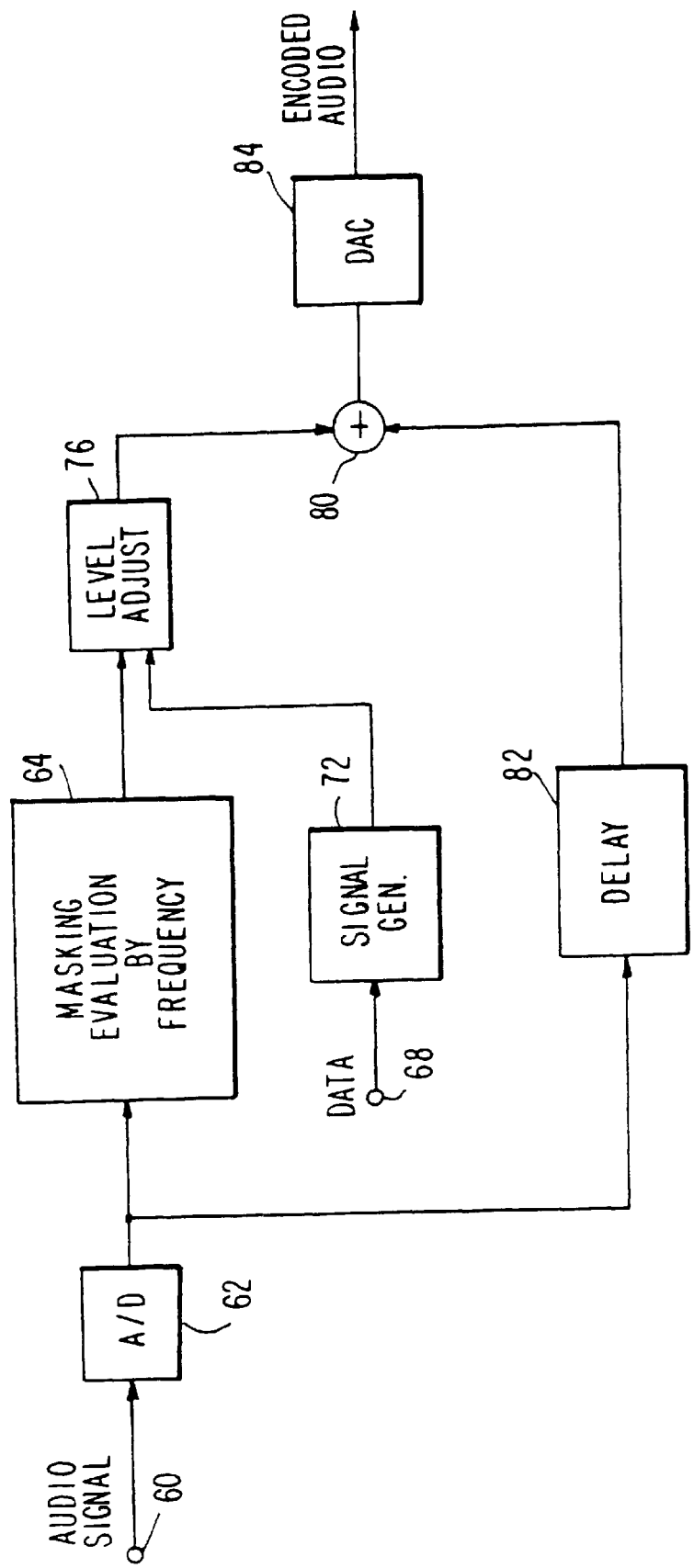
FIG. 2 is a functional block diagram of a digital encoder in accordance with an embodiment of the present invention.

An embodiment of a digital encoder is illustrated in FIG. 2. In this embodiment, an audio signal in analog form is received at an input terminal 60 and converted to digital form by an A/D converter 62. The digitized audio signal is supplied for masking evaluation, as indicated functionally by the block 64 pursuant to which the digitized audio signal is separated into frequency components, for example, by Fast Fourier Transform (FFT), wavelet transform, or other time-to-frequency domain transformation, or else by digital filtering. Thereafter, the masking abilities of audio signal frequency components within frequency bins of interest are evaluated for their tonal masking ability, narrow band masking ability and broadband masking ability (and, if necessary or appropriate, for non-simultaneous masking ability). Alternatively, the masking abilities of audio signal frequency components within frequency bins of interest are evaluated with a sliding tonal analysis.

Data to be encoded is received at an input terminal 68 and, for each data state corresponding to a given signal interval, its respective group of code components is produced, as indicated by the signal generation functional block 72, and subjected to level adjustment, as indicated by the block 76 which is also supplied with the relevant masking evaluations. Signal generation may be implemented, for example, by means of a look-up table storing each of the code components as time domain data or by interpolation of stored data. The code components can either be permanently stored or generated upon initialization of the system of FIG. 2 and then stored in memory, such as in RAM, to be output as appropriate in response to the data received at terminal 68. The values of the components may also be computed at the time they are generated.

Level adjustment is carried out for each of the code components based upon the relevant masking evaluations as discussed above, and the code components whose amplitude has been adjusted to ensure inaudibility are added to the digitized audio signal as indicated by the summation symbol 80. Depending on the amount of time necessary to carry out the foregoing processes, it may be desirable to delay the digitized audio signal, as indicated at 82 by temporary storage in memory. If the audio signal is not delayed, after an FFT and masking evaluation have been carried out for a first interval of the audio signal, the amplitude adjusted code components are added to a second interval of the audio signal following the first interval. If the audio signal is delayed, however, the amplitude adjusted code components can instead be added to the first interval and a simultaneous masking evaluation may thus be used. Moreover, if the portion of the audio signal during the first interval provides a greater masking capability for a code component added during the second interval than the portion of the audio signal during the second interval would provide to the code component during the same interval, an amplitude may be assigned to the code component based on the non-simultaneous masking abilities of the portion of audio signal within the first interval. In this fashion both simultaneous and non-simultaneous masking capabilities may be evaluated and an optimal amplitude can be assigned to each code component based on the more advantageous evaluation.

In certain applications, such as in broadcasting, or analog recording (as on a conventional tape cassette), the encoded audio signal in digital form is converted to analog form by a digital-to-analog converter (DAC) 84. However, when the signal is to be transmitted or recorded in digital form, the DAC 84 may be omitted.

The various functions illustrated in FIG. 2 may be implemented, for example, by a digital signal processor or by a personal computer, workstation, mainframe, or other digital computer.

Figure 3:
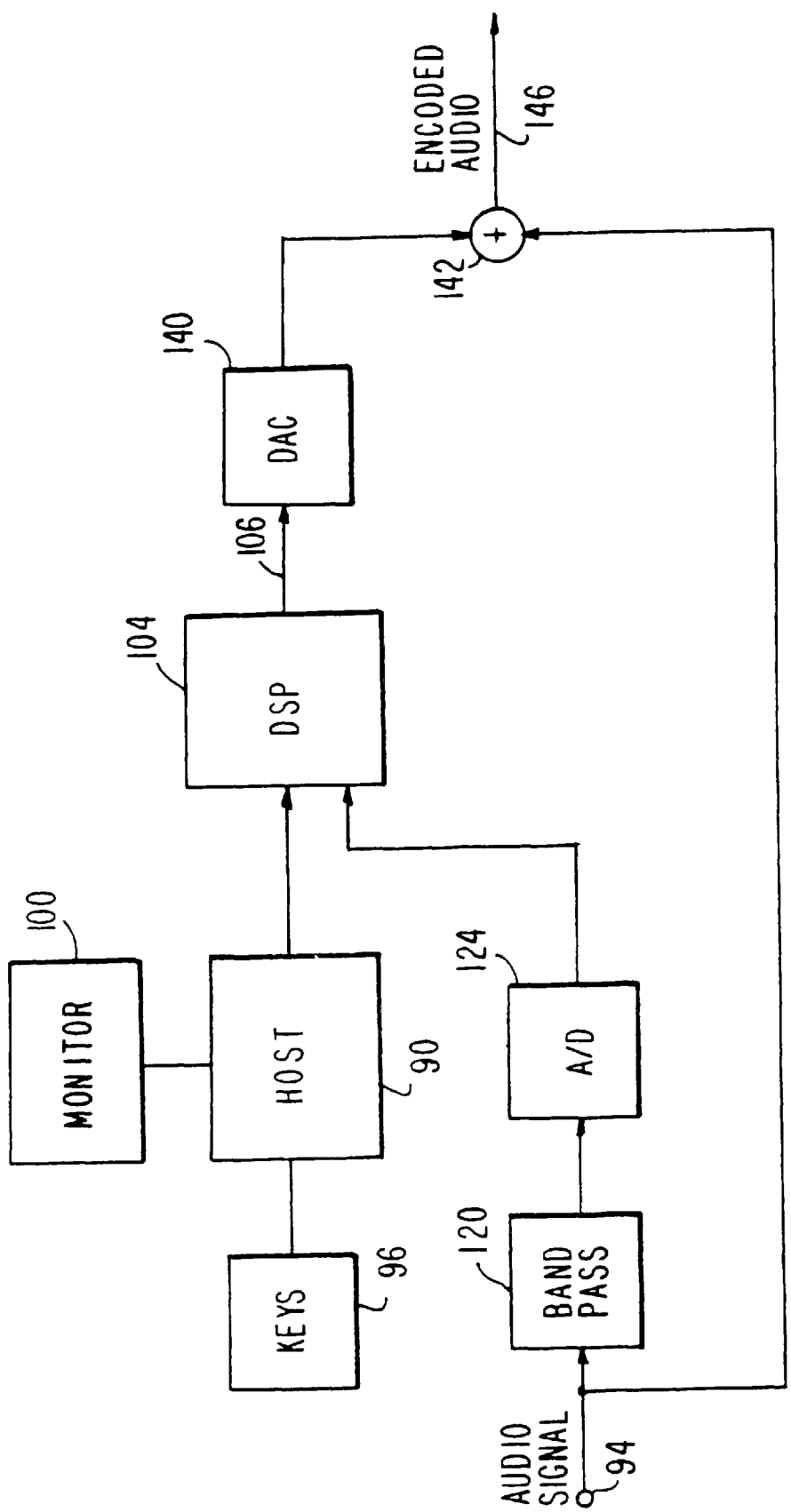
FIG. 3 is a block diagram of an encoding system for use in encoding audio signals supplied in analog form.

FIG. 3 is a block diagram of an encoding system for use in encoding audio signals supplied in analog form, such as in a conventional broadcast studio. In the system of FIG. 3, a host processor 90 which may be, for example, a personal computer, supervises the selection and generation of information to be encoded for inclusion in an analog audio signal received at an input terminal 94. The host processor 90 is coupled with a keyboard 96 and with a monitor 100, such as a CRT monitor, so that a user may select a desired message to be encoded while choosing from a menu of available messages displayed by the monitor 100. A typical message to be encoded in a broadcast audio signal could include station or channel identification information, program or segment information and/or a time code.

Once the desired message has been input to the host processor 90, the host proceeds to output data representing the symbols of the message to a digital signal processor (DSP) 104 which proceeds to encode each symbol received from the host processor 90 in the form of a unique set of code signal components as described hereinbelow. In one embodiment, the host processor generates a four state data stream, that is, a data stream in which each data unit can assume one of four distinct data states each representing a unique symbol including two synchronizing symbols termed "E" and "S" herein and two message information symbols "1" and "0" each of which represents a respective binary state. It will be appreciated that any number of distinct data states may be employed. For example, instead of two message information symbols, three data states may be represented by three unique symbols which permits a correspondingly larger amount of information to be conveyed by a data stream of a given size.

For example, when the program material represents speech, it is advantageous to transmit a symbol for a relatively longer period of time than in the case of program audio having a substantially more continuous energy content, in order to allow for the natural pauses or gaps present in speech. Accordingly, to ensure that information throughput is sufficiently high in this case, the number of possible message information symbols is advantageously increased. For symbols representing up to five bits, symbol transmission lengths of two, three and four seconds provide increasingly greater probabilities of correct decoding. In some such embodiments, an initial symbol ("E") is decoded when (i) the energy in the FFT bins for this symbol is greatest, (ii) the average energy minus the standard deviation of the energy for this symbol is greater than the average energy plus the average standard deviation of the energy for all other symbols, and (iii) the shape of the energy versus time curve for this symbol has a generally bell shape, peaking at the intersymbol temporal boundary.

Figure 4:
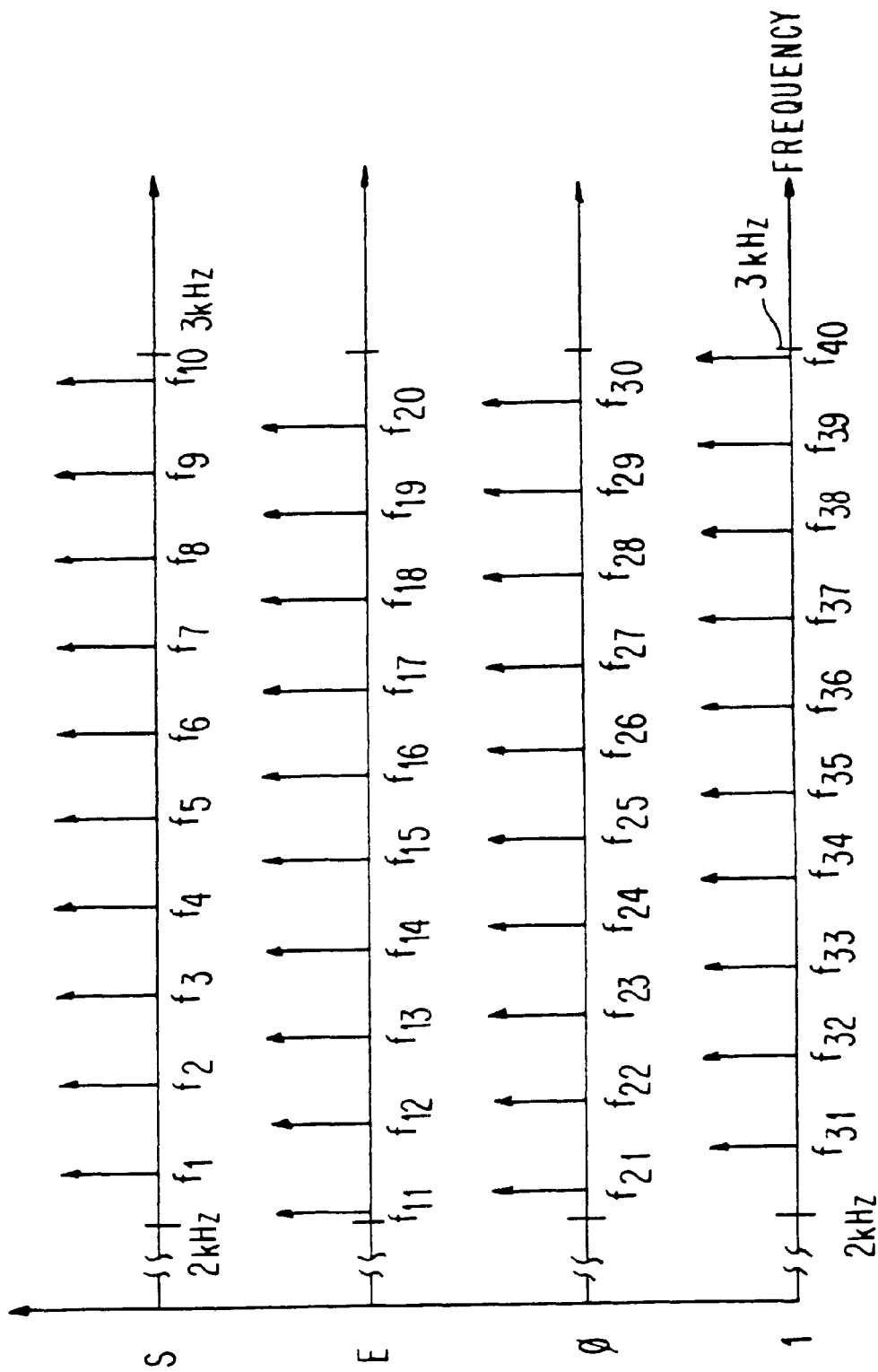
FIG. 4 provides spectral diagrams for use in illustrating frequency compositions of various data symbols as encoded by the embodiment of FIG. 3.

In the embodiment of FIG. 3, as the DSP 104 has received the symbols of a given message to be encoded, it responds by generating a unique set of code frequency components for each symbol which it supplies at an output 106. With reference also to FIG. 4, spectral diagrams are provided for each of the four data symbols S, E, 0 and 1 of the exemplary data set described above. As shown in FIG. 4, in this embodiment the symbol S is represented by a unique group of ten code frequency components $f_1$ through $f_{10}$ arranged at equal frequency intervals in a range extending from a frequency value slightly greater than 2 kHz to a frequency value slightly less than 3 kHz. The symbol E is represented by a second unique group of ten code frequency components $f_{11}$ through $f_{20}$ arranged in the frequency spectrum at equal intervals from a first frequency value slightly greater than 2 kHz up to a frequency value slightly less than 3 kHz, wherein each of the code components $f_{11}$ through $f_{20}$ has a unique frequency value different from all others in the same group as well as from all of the frequencies $f_1$ through $f_{10}$. The symbol 0 is represented by a further unique group of ten code frequency components $f_{21}$ through $f_{30}$ also arranged at equal frequency intervals from a value slightly greater than 2 kHz up to a value slightly less than 3 kHz and each of which has a unique frequency value different from all others in the same group as well as from all of the frequencies $f_1$ through $f_{20}$. Finally, the symbol 1 is represented by a further unique group of ten code frequency components $f_{31}$ through $f_{40}$ also arranged at equal frequency intervals from a value slightly greater than 2 kHz to a value slightly less than 3 kHz, such that each of the components $f_{31}$ through $f_{40}$ has a unique frequency value different from any of the other frequency components $f_1$ through $f_{40}$. By using multiple code frequency components for each data state so that the code components of each state are substantially separated from one another in frequency, the presence of noise (such as non-code audio signal components or other noise) in a common detection band with any one code component of a given data state is less likely to interfere with detection of the remaining components of that data state.

In other embodiments, it is advantageous to represent the symbols by multiple frequency components, for example ten code tones or frequency components, which are not uniformly spaced in frequency, and which do not have the same offset from symbol to symbol. Avoiding an integral relationship between code frequencies for a symbol by clustering the tones reduces the effects of interfrequency beating and room nulls, that is, locations where echoes from room walls interfere with correct decoding. The following sets of code tone frequency components for the four symbols (0, 1, S and E) is provided for alleviating the effects of room nulls, where $f_1$ through $f_{10}$ represent respective code frequency components of each of the four symbols (expressed in Hertz):

|     | "0"    | "1"    | "S"    | "E"    |
| --- | ------ | ------ | ------ | ------ |
| f1  | 1046.9 | 1054.7 | 1062.5 | 1070.3 |
| f2  | 1195.3 | 1203.1 | 1179.7 | 1187.5 |
| f3  | 1351.6 | 1343.8 | 1335.9 | 1328.1 |
| f4  | 1492.2 | 1484.4 | 1507.8 | 1500.0 |
| f5  | 1656.3 | 1664.1 | 1671.9 | 1679.7 |
| f6  | 1859.4 | 1867.2 | 1843.8 | 1851.6 |
| f7  | 2078.1 | 2070.3 | 2062.5 | 2054.7 |
| f8  | 2296.9 | 2289.1 | 2304.7 | 2312.5 |
| f9  | 2546.9 | 2554.7 | 2562.5 | 2570.3 |
| f10 | 2859.4 | 2867.2 | 2843.8 | 2851.6 |

Generally speaking, in the examples provided above, the spectral content of the code varies relatively little when the DSP 104 switches its output from any of the data states S, E, 0 and 1 to any other thereof. In accordance with one aspect of the present invention in certain advantageous embodiments, each code frequency component of each symbol is paired with a frequency component of each of the other data states so that the difference therebetween is less than the critical bandwidth therefor. For any pair of pure tones, the critical bandwidth is a frequency range within which the frequency separation between the two tones may be varied without substantially increasing loudness. Since the frequency separation between adjacent tones in the case of each of data states S, E, 0 and 1 is the same, and since each tone of each of the data states S, E, 0 and 1 is paired with a respective tone of each of the others thereof so that the difference in frequency therebetween is less than the critical bandwidth for that pair, there will be substantially no change in loudness upon transition from any of the data states S, E, 0 and 1 to any of the others thereof when they are reproduced as sound. Moreover, by minimizing the difference in frequency between the code components of each pair, the relative probabilities of detecting each data state when it is received is not substantially affected by the frequency characteristics of the transmission path. A further benefit of pairing components of different data states so that they are relatively close in frequency is that a masking evaluation carried out for a code component of a first data state will be substantially accurate for a corresponding component of a next data state when switching of states take place.

Alternatively, in the non-uniform code tone spacing scheme to minimize the effects of room nulls, it will be seen that the frequencies selected for each of the code frequency components $f_1$ through $f_{10}$ are clustered around a frequency, for example, the frequency components for f1, f2 and f3 are located in the vicinity of 1055 Hz, 1180 Hz and 1340 Hz, respectively. Specifically, in this exemplary embodiment, the tones are spaced apart by two times the FFT resolution, for example, for a resolution of 4 Hz, the tones are shown as spaced apart by 8 Hz, and are chosen to be in the middle of the frequency range of an FFT bin. Also, the order of the various frequencies which are assigned to the code frequency components $f_1$ through $f_{10}$ for representing the various symbols 0, 1, S and E is varied in each cluster. For example, the frequencies selected for the components f1, f2 and f3 correspond to the symbols (0, 1, S, E), (S, E, 0, 1) and (E, S, 1, 0), respectively, from lowest to highest frequency, that is, (1046.9, 1054.7, 1062.5, 1070.3), (1179.7, 1187.5, 1195.3, 1203.1), (1328.1, 1335.9, 1343.8, 1351.6). A benefit of this scheme is that even if there is a room null which interferes with correct reception of a code component, in general the same tone is eliminated from each of the symbols, so it is easier to decode a symbol from the remaining components. In contrast, if a room null eliminates a component from one symbol but not from another symbol, it is more difficult to correctly decode the symbol.

It will be appreciated that, in the alternative, either more or less than four separate data states or symbols may be employed for encoding. Moreover, each data state or symbol may be represented by more or less than ten code tones, and while it is preferable that the same number of tones be used to represent each of the data states, it is not essential in all applications that the number of code tones used to represent each data state be the same. Preferably, each of the code tones differs in frequency from all of the other code tones to maximize the probability of distinguishing each of the data states upon decoding. However, it is not essential in all applications that none of the code tone frequencies are shared by two or more dater states.

Figure 5:
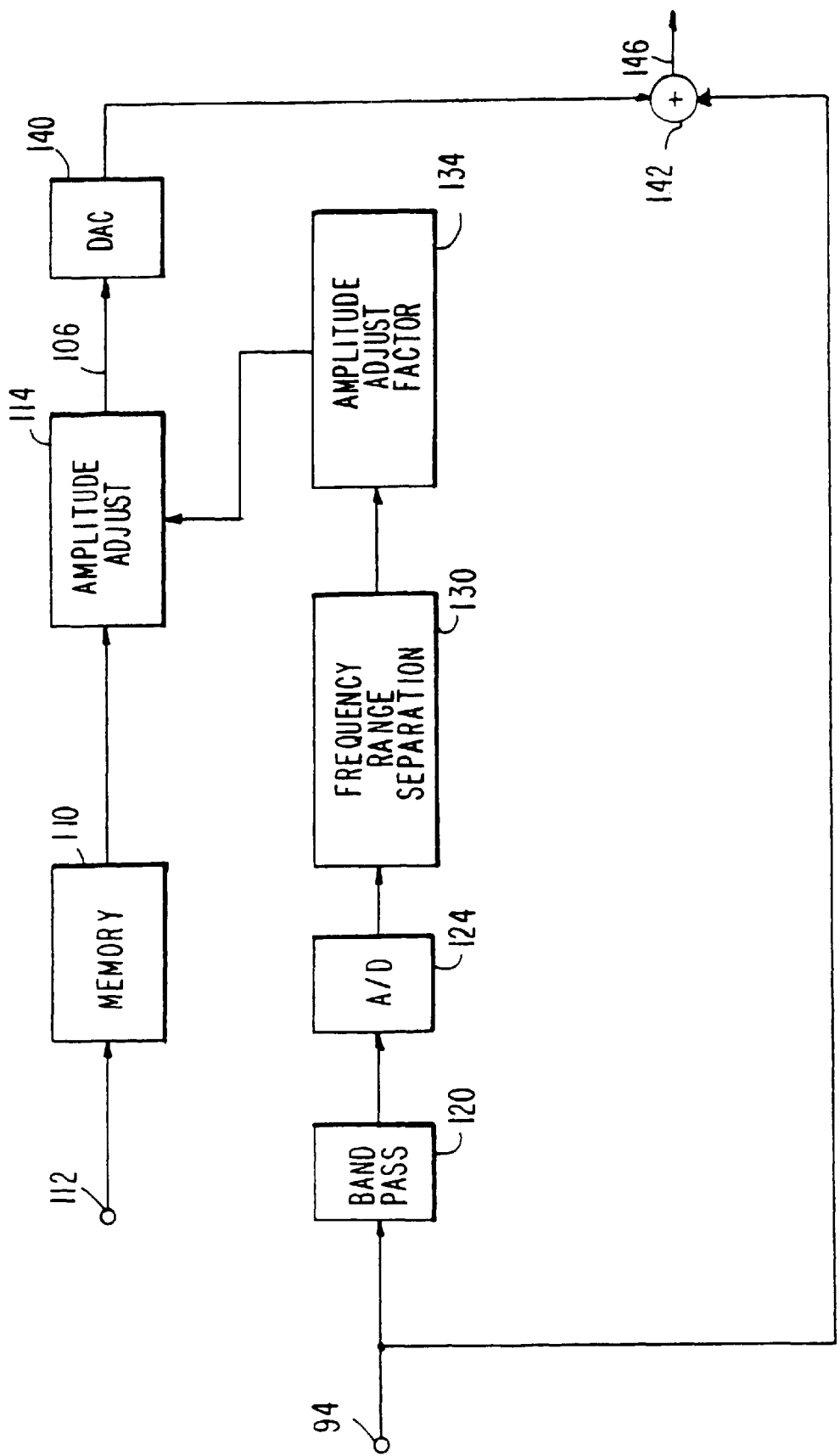

FIG. 5 is a functional block diagram to which reference is made in explaining the encoding operation carried out by the embodiment of FIG. 3. As noted above, the DSP 104 receives data from the host processor 90 designating the sequence of data states to be output by the DSP 10,4 as respective groups of code frequency components. Advantageously, the DSP 104 generates a look-up table of time domain representations for each of the code frequency components $f_1$ through $f_{40}$ which it then stores in a RAM thereof, represented by the memory 110 of FIG. 5. In response to the data received from the host processor 90, the DSP 104 generates a respective address which it applies to an address input of the memory 110, as indicated at 112 in FIG. 5, to cause the memory 110 to output time domain data for each of the ten frequency components corresponding to the data state to be output at that time.

With reference also to FIG. 6, which is a functional block diagram for illustrating certain operations carried out by the DSP 104, the memory 110 stores a sequence of time-domain values for each of the frequency components of each of the symbols S, E, 0 and 1. In this particular embodiment, since the code frequency components range from approximately 2 kHz up to approximately 3 kHz, a sufficiently large number of time domain samples are stored in the memory 110 for each of the frequency components $f_1$ through $f_{40}$ so that they may be output at a rate higher than the Nyquist frequency of the highest frequency code component. The time domain code components are output at an appropriately high rate from the memory 110 which stores time-domain components for each of the code frequency components representing a predetermined duration so that (n) time-domain components are stored for each of the code frequency components $f_1$ through $f_{40}$ for (n) time intervals $t_1$ through $t_n$, as shown in FIG. 6. For example, if the symbol S is to be encoded during a given signal interval, during the first interval $t_1$, the memory 110 outputs the time-domain components $f_1$ through $f_{10}$ corresponding to that interval, as stored in the memory 110. During the next interval, the time-domain components $f_1$ through $f_{10}$ for the interval $t_2$ are output by the memory 110. This process continues sequentially for the intervals $t_3$ through $t_n$ and back to $t_1$ until the duration of the encoded symbol S has expired.

In certain embodiments, instead of outputting all ten code components, e.g., f1 through f10, during a time interval, only those of the code components lying within the critical bandwidth of the tones of the audio signal are output. This is a generally conservative approach to ensuring inaudibility of the code components.

With reference again to FIG. 5, the DSP 104 also serves to adjust the amplitudes of the time-domain components output by the memory 110 so that, when the code frequency components are reproduced as sound, they will be masked by components of the audio signal in which they have been included such that they are inaudible to human hearing. Consequently, the DSP 104 is also supplied with the audio signal received at the input terminal 94 after appropriate filtering and analog-to-digital conversion. More specifically, the encoder of FIG. 3 includes an analog band pass filter 120 which serves to substantially remove audio signal frequency components outside of a band of interest for evaluating the masking ability of the received audio signal which in the present embodiment extends from approximately 1.5 kHz to approximately 3.2 kHz. The filter 120 also serves to remove high frequency components of the audio signal which may cause aliasing when the signal is subsequently digitized by an analog-to-digital convertor (A/D) 124 operating at a sufficiently high sampling rate.

As indicated in FIG. 3, the digitized audio signal is supplied by the A/D 124 to DSP 104 where, as indicated at 130 in FIG. 5, the program audio signal undergoes frequency range separation. In this particular embodiment, frequency range separation is carried out as a Fast Fourier Transform (FFT) which is performed periodically with or without temporal overlap to produce successive frequency bins each having a predetermined frequency width. Other techniques are available for segregating the frequency components of the audio signals, such as a wavelet transform, discrete Walsh Hadamard transform, discrete Hadamard transform, discrete cosine transform, as well as various digital filtering techniques.

Once the DSP 104 has separated the frequency components of the digitized audio signal into the successive frequency bins, as mentioned above, it then proceeds to evaluate the ability of various frequency components present in the audio signal to mask the various code components output by the memory 110 and to produce respective amplitude adjustment factors which serve to adjust the amplitudes of the various code frequency components such that they will be masked by the program audio when reproduced as sound so that they will be inaudible to human hearing. These processes are represented by the block 134 in FIG. 5.

For audio signal components that are substantially simultaneous with the code frequency components they are to mask (but which precede the code frequency components by a short period of time), the masking ability of the program audio components is evaluated on a tonal basis, as well as on a narrow band masking basis and on a broadband masking basis, as described below. For each code frequency component which is output at a given time by the memory 110, a tonal masking ability is evaluated for each of a plurality of audio signal frequency components based on the energy level in each of the respective bins in which these components fall as well as on the frequency relationship of each bin to the respective code frequency component. The evaluation in each case (tonal, narrow band and broadband) may take the form of an amplitude adjustment factor or other measure enabling a code component amplitude to be assigned so that the code component is masked by the audio signal. Alternatively, the evaluation may be a sliding tonal analysis.

In the case of narrow band masking, in this embodiment for each respective code frequency component the energy content of frequency components below a predetermined level within a predetermined frequency band including the respective code frequency component is evaluated to derive a separate masking ability evaluation. In certain implementations narrow band masking capability is measured based on the energy content of those audio signal frequency components below the average bin energy level within the predetermined frequency band. In this implementation, the energy levels of the components below the energy levels of the components below the average bin energy (as a component threshold) are summed to produce a narrow band energy level in response to which a corresponding narrow band masking evaluation for the respective code component is identified. A different narrow band energy level may instead be produced by selecting a component threshold other than the average energy level. Moreover, in still other embodiments, the average energy level of all audio signal components within the predetermined frequency band instead is used as the narrow band energy level for assigning a narrow band masking evaluation to the respective code component. In still further embodiments, the total energy content of audio signal components within the predetermined frequency band instead is used, while in other embodiments a minimum component level within the predetermined frequency band is used for this purpose.

Finally, in certain implementations the broadband energy content of the audio signal is determined to evaluate the ability of the audio signal to mask the respective code frequency component on a broadband masking basis. In this embodiment, the broadband masking evaluation is based on the minimum narrow band energy level found in the course of the narrow band masking evaluations described above. That is, if four separate predetermined frequency bands have been investigated in the course of evaluating narrow band masking as described above, and broadband noise is taken to include the minimum narrow band energy level among all four predetermined frequency bands (however determined), then this minimum narrow band energy level is multiplied by a factor equal to the ratio of the range of frequencies spanned by all four narrow bands to the bandwidth of the predetermined frequency band having the minimum narrow band energy level. The resulting product indicates a permissible overall code power level. If the overall permissible code power level is designated P, and the code includes ten code components, each is then assigned an amplitude adjustment factor to yield a component power level which is 10 dB less than P. In the alternative, broadband noise is calculated for a predetermined, relatively wide band encompassing the code components by selecting one of the techniques discussed above for assessing the narrow band energy level but instead using the audio signal components throughout the predetermined, relatively wide band. Once the broadband noise has been determined in the selected manner, a corresponding broadband masking evaluation is assigned to each respective code component.

The amplitude adjust factor for each code frequency component is then selected based upon that one of the tonal, narrow band and broadband masking evaluations yielding the highest permissible level for the respective component. This maximizes the probability that each respective code frequency component will be distinguishable from non-audio signal noise while at the same time ensuring that the respective code frequency component will be masked so that it is inaudible to human hearing.

The amplitude adjust factors are selected for each of tonal, narrow band and broadband masking based on the following factors and circumstances. In the case of tonal masking, the factors are assigned on the basis of the frequencies of the audio signal components whose masking abilities are being evaluated and the frequency or frequencies of the code components to be masked. Moreover, a given audio signal over any selected interval provides the ability to mask a given code component within the same interval (i.e., simultaneous masking) at a maximum level greater than that at which the same audio signal over the selected interval is able to mask the same code component occurring before or after the selected interval (i.e., non-simultaneous masking). The conditions under which the encoded audio signal will be heard by an audience or other listening group, as appropriate, preferably are also taken into consideration. For example, if television audio is to be encoded, the distorting effects of a typical listening environment are preferably taken into consideration, since in such environments certain frequencies are attenuated more than others. Receiving and reproduction equipment (such as graphic equalizers) can cause similar effects. Environmental and equipment related effects can be compensated by selecting sufficiently low amplitude adjust factors to ensure masking under anticipated conditions.

In certain embodiments only one of tonal, narrow band or broadband masking capabilities are evaluated. In other embodiments two of such different types of masking capabilities are evaluated, and in still others all three are employed.

In certain embodiments, a sliding tonal analysis is employed to evaluate the masking capability of the audio signal. A sliding tonal analysis generally satisfies the masking rules for narrow band noise, broadband noise and single tones without requiring audio signal classification. In the sliding tonal analysis, the audio signal is regarded as a set of discrete tones, each being centered in a respective FFT frequency bin. Generally, the sliding tonal analysis first computes the power of the audio signal in each FFT bin. Then, for each code tone, the masking effects of the discrete tones of the audio signal in each FFT bin separated in frequency from such code tone by no more than the critical bandwidth of the audio tone are evaluated based on the audio signal power in each such bin using the masking relationships for single tone masking. The masking effects of all of the relevant discrete tones of the audio signal are summed for each code tone, then adjusted for the number of tones within the critical bandwidth of the audio signal tones and the complexity of the audio signal. As explained below, in certain embodiments, the complexity of the program material is empirically based on the ratio of the power in the relevant tones of the audio signal and the root sum of squares power in such audio signal tones. The complexity serves to account for the fact that narrow band noise and broadband noise each provide much better masking effects than are obtained from a simple summation of the tones used to model narrow band and broadband noise.

In certain embodiments which employ a sliding tonal analysis, a predetermined number of samples of the audio signal first undergo a large FFT, which provides high resolution but requires longer processing time. Then, successive portions of the predetermined number of samples undergo a relatively smaller FFT, which is faster but provides less resolution. The amplitude factors found from the large FFT are merged with those found from the smaller FFTs, which generally corresponds to time weighting the higher "frequency accuracy" large FFT by the higher "time accuracy" of the smaller FFT.

In the embodiment of FIG. 5, once an appropriate amplitude adjust factor has been selected for each of the code frequency components output by the memory 110, the DSP 104 adjusts the amplitude of each code frequency component accordingly, as indicated by the functional block "amplitude adjust" 114. In other embodiments, each code frequency component is initially generated so that its amplitude conforms to its respective adjust factor. With reference also to FIG. 6, the amplitude adjust operation of the DSP 104 in this embodiment multiplies the ten selected ones of the time domain code frequency components values $f_1$ through $f_{40}$ for the current time interval $t_1$ through $t_n$ by a respective amplitude adjust factor $G_{A1}$ through $G_{A10}$ and then the DSP 104 proceeds to add the amplitude adjusted time domain components to produce a composite code signal which it supplies at its output 106. With reference to FIGS. 3 and 5, the composite code signal is converted to analog form by a digital-to-analog converter (DAC) 140 and supplied thereby to a first input of a summing circuit 142. The summing circuit 142 receives the audio signal from the input terminal 94 at a second input and adds the composite analog code signal to the analog audio signal to supply an encoded audio signal at an output 146 thereof.

In radio broadcasting applications, the encoded audio signal modulates a carrier wave and is broadcast over the air. In NTSC television broadcasting applications, the encoded audio signal frequency modulates a subcarrier and is mixed with a composite video signal so that the combined signal is used to modulate a broadcast carrier for over-the-air broadcast. The radio and television signals, of course, may also be transmitted by cable (for example, conventional or fiber optic cable), satellite or otherwise. In other applications, the encoded audio can be recorded either for distribution in recorded form or for subsequent broadcast or other wide dissemination. Encoded audio may also be employed in point-to-point transmissions. Various other applications, and transmission and recording techniques will be apparent.

Figure 7A:
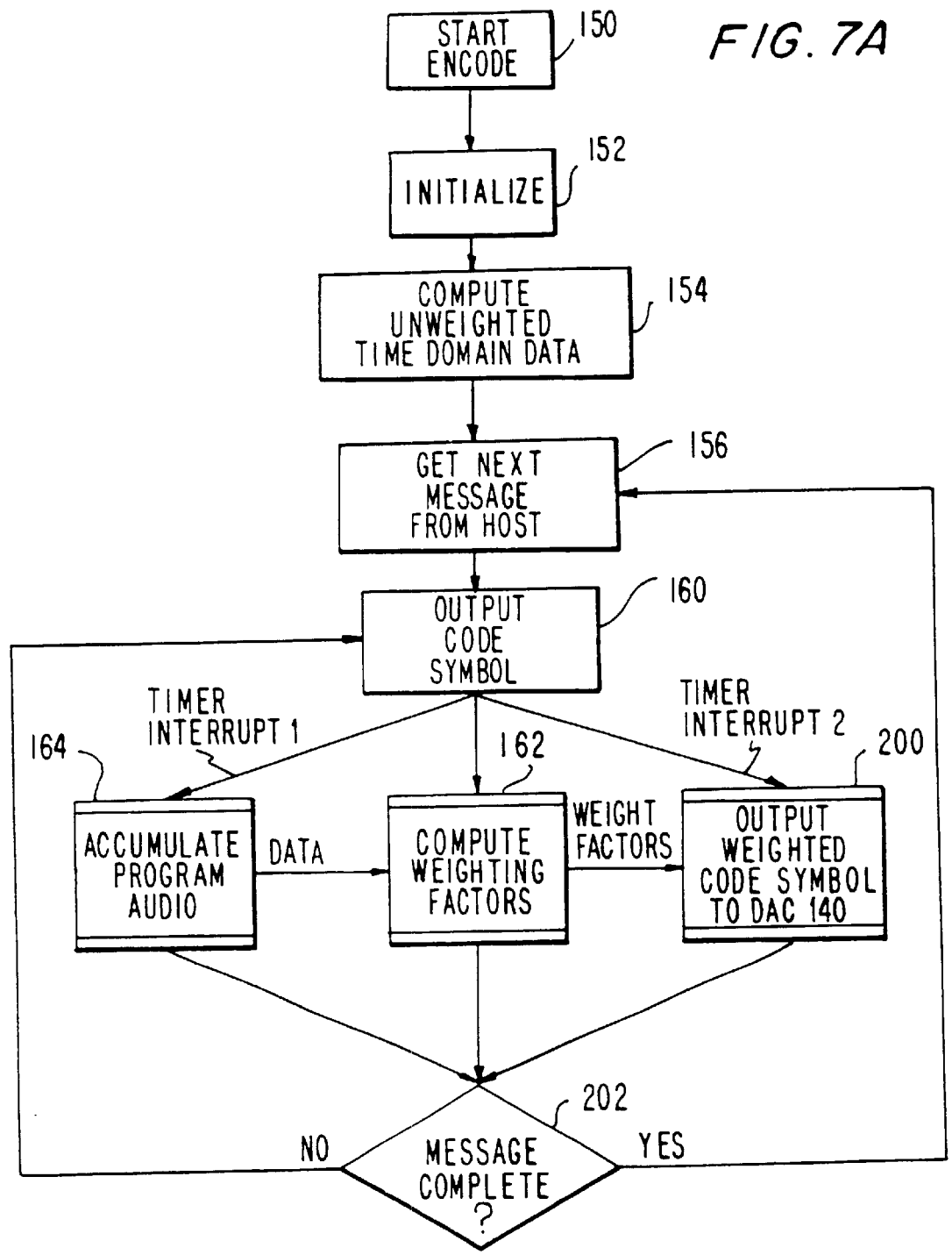
FIGS. 7A through 7C are flow charts for illustrating a software routine employed in the embodiment of FIG. 3.
Figure 7B:
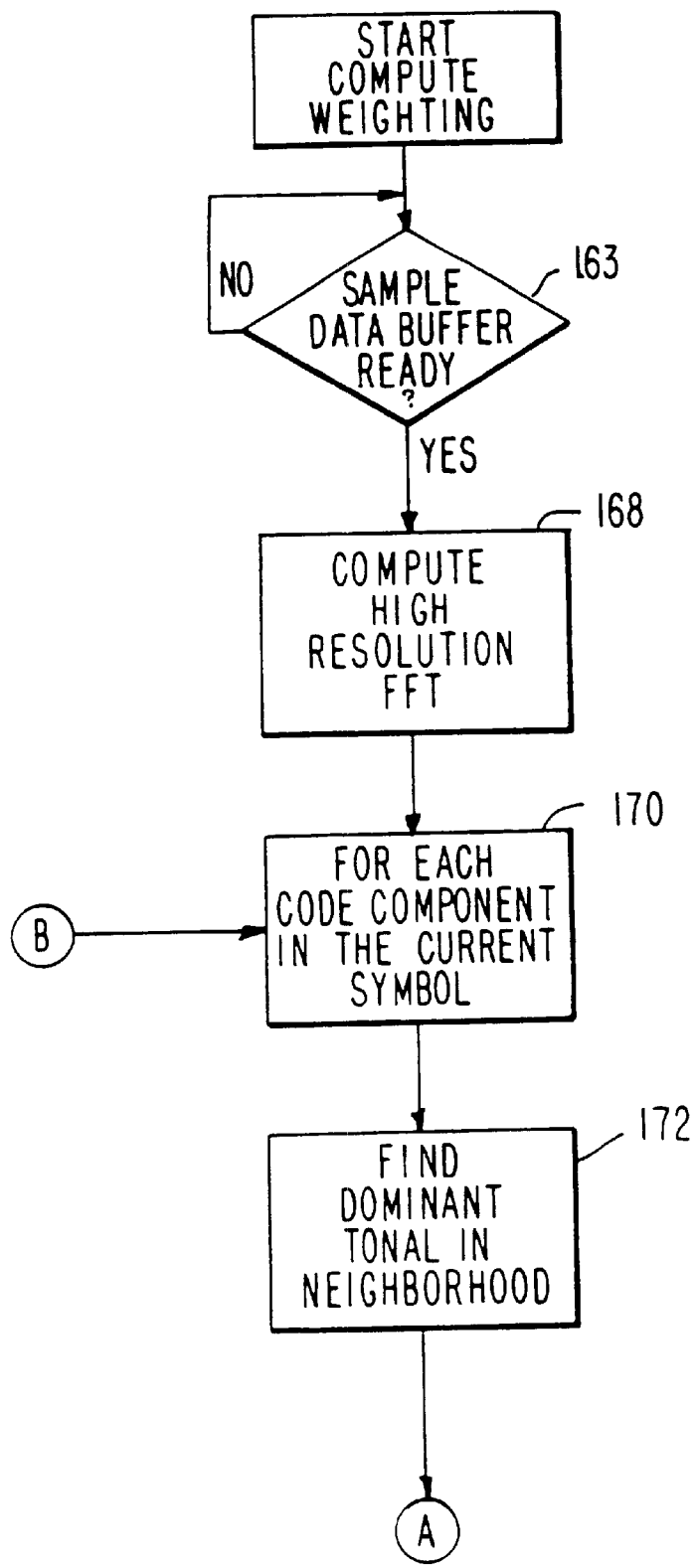
Figure 7C:
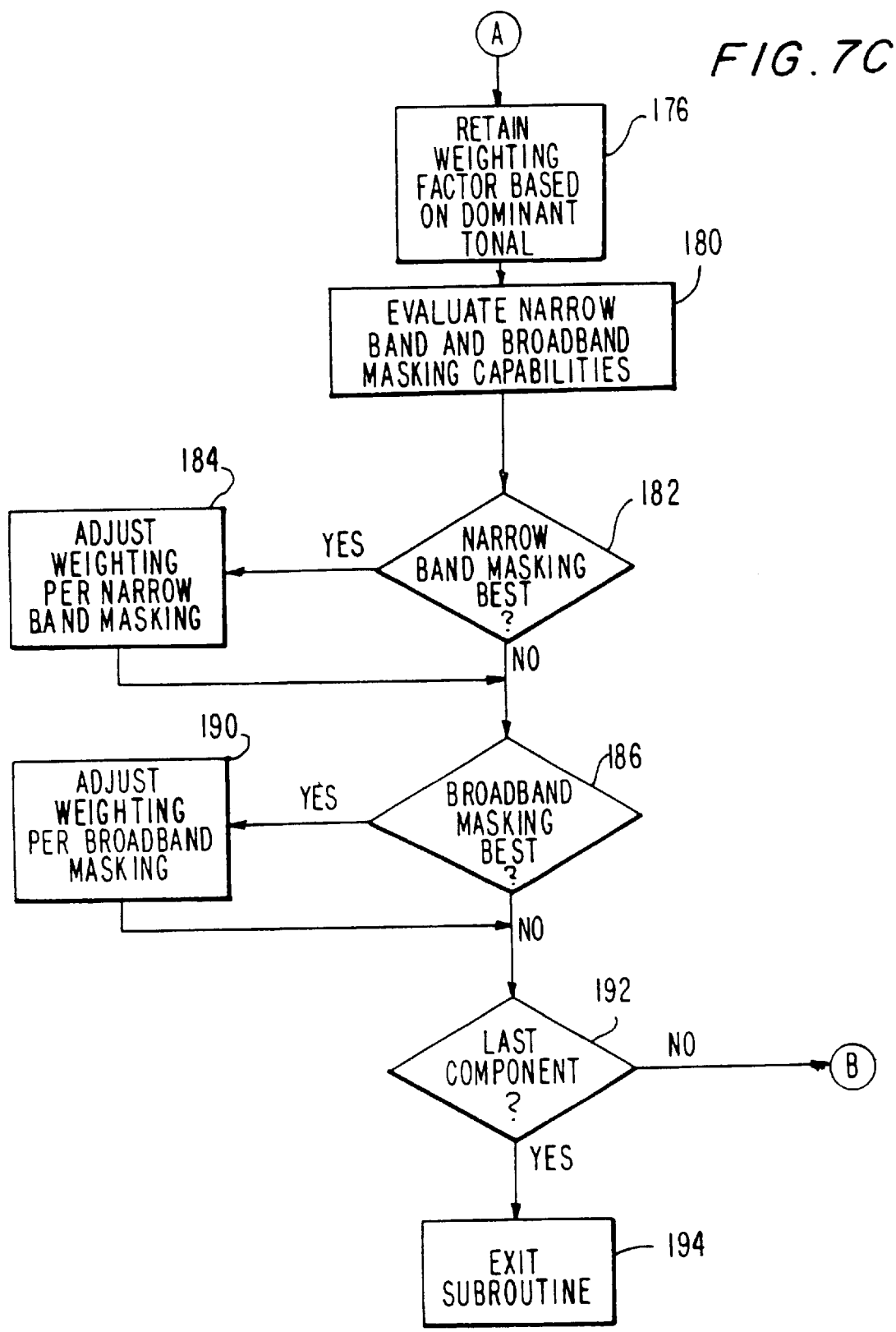

FIGS. 7A through 7C provide flow charts for illustrating a software routine carried out by the DSP 104 for implementing the evaluation of tonal, narrow band and broadband masking functions thereof described above. FIG. 7A illustrates a main loop of the software program of the DSP 104. The program is initiated by a command from the host processor 90 (step 150), whereupon the DSP 104 initializes its hardware registers (step 152) and then proceeds in step 154 to compute unweighted time domain code component data as illustrated in FIG. 6 which it then stores in memory to be read out as needed to generate the time domain code components, as mentioned hereinabove. In the alternative, this step may be omitted if the code components are stored permanently in a ROM or other nonvolatile storage. It is also possible to calculate the code component data when required, although this adds to the processing load. Another alternative is to produce unweighted code components in analog form and then adjust the amplitudes of the analog components by means of weighting factors produced by a digital processor.

Once the time domain data has been computed and stored, in step 156 the DSP 104 communicates a request to the host processor 90 for a next message to be encoded. The message is a string of characters, integers, or other set of data symbols uniquely identifying the code component groups to be output by the DSP 104 in an order which is predetermined by the message. In other embodiments, the host, knowing the output data rate of the DSP, determines on its own when to supply a next message to the DSP by setting an appropriate timer and supplying the message upon a time-out condition. In a further alternative embodiment, a decoder is coupled with the output of the DSP 104 to receive the output code components in order to decode the same and feed back the message to the host processor as output by the DSP so that the host can determine when to supply a further message to the DSP 104. In still other embodiments, the functions of the host processor 90 and the DSP 104 are carried out by a single processor.

Once the next message has been received from the host processor, pursuant to step 156, the DSP proceeds to generate the code components for each symbol of the message in order and to supply the combined, weighted code frequency components at its output 106. This process is represented bay a loop identified by the tag 160 in FIG. 7A.

Upon entering the loop symbolized by the tag 160, the DSP 104 enables timer interrupts 1 and 2 and then enters a "compute weighting factors" subroutine 162 which will be described in connection with the flow charts of FIGS. 7B and 7C. With reference first to FIG. 7B, upon entering the compute weighting factors subroutine 162 the DSP first determines whether a sufficient number of audio signal samples have been stored to permit a high-resolution FFT to be carried out in order to analyze the spectral content of the audio signal during a most recent predetermined audio signal interval, as indicated by step 163. Upon start up, a sufficient number of audio signal samples must first be accumulated to carry out the FFT. However, if an overlapping FFT is employed, during subsequent passes through the loop correspondingly fewer data samples need be stored before the next FFT is carried out.

As will be seen from FIG. 7B, the DSP remains in a tight loop at the step 163 awaiting the necessary sample accumulation. Upon each timer interrupt 1, the A/D 124 provides a new digitized sample of the program audio signal which is accumulated in a data buffer of the DSP 104, as indicated by the subroutine 164 in FIG. 7A.

Returning to FIG. 7B, once a sufficiently large number of sample data have been accumulated by the DSP, processing continues in a step 168 wherein the above-mentioned high resolution FFT is carried out on the audio signal data samples of the most recent audio signal interval. Thereafter, as indicated by a tag 170, a respective weighting factor or amplitude adjust factor is computed for each of the ten code frequency components in the symbol currently being encoded. In a step 172, that one of the frequency bins produced by the high resolution FFT (step 168) which provides the ability to mask the highest level of the respective code component on a single tone basis (the "dominant tonal") is determined in the manner discussed above.

With reference also to FIG. 7C, in a step 176, the weighting factor for the dominant tonal is determined and retained for comparison with relative masking abilities provided by narrow band and broadband masking and, if found to be the most effective masker, is used as the weighting factor for setting the amplitude of the current code frequency component. In a subsequent step 180, an evaluation of narrow band and broadband masking capabilities is carried out in the manner described above. Thereafter, in a step 182, it is determined whether narrow band masking provides the best ability to mask the respective code component and if so, in a step 184, the weighting factor is updated based on narrow band masking. In a subsequent step 186, it is determined whether broadband masking provides the best ability to mask the respective code frequency component and, if so, in a step 190, the weighting factor for the respective code frequency component is adjusted based on broadband masking. Then, in step 192 it is determined whether weighting factors have been selected for each of the code frequency components to be output presently to represent the current symbol and, if not, the loop is re-initiated to select a weighting factor for the next code frequency component. If, however, the weighting factors for all components have been selected, then the subroutine is terminated as indicated in step 194.

Upon the occurrence of timer interrupt 2, processing continues to a subroutine 200 wherein the functions illustrated in FIG. 6 above are carried out. That is, in the subroutine 200 the weighting factors calculated during the subroutine 162 are used to multiply the respective time domain values of the current symbol to be output and then the weighted time domain code component values are added and output as a weighted, composite code signal to the DAC 140. Each code symbol is output for a predetermined period of time upon the expiration of which processing returns to the step 156 from the step 202.

Figure 7E:
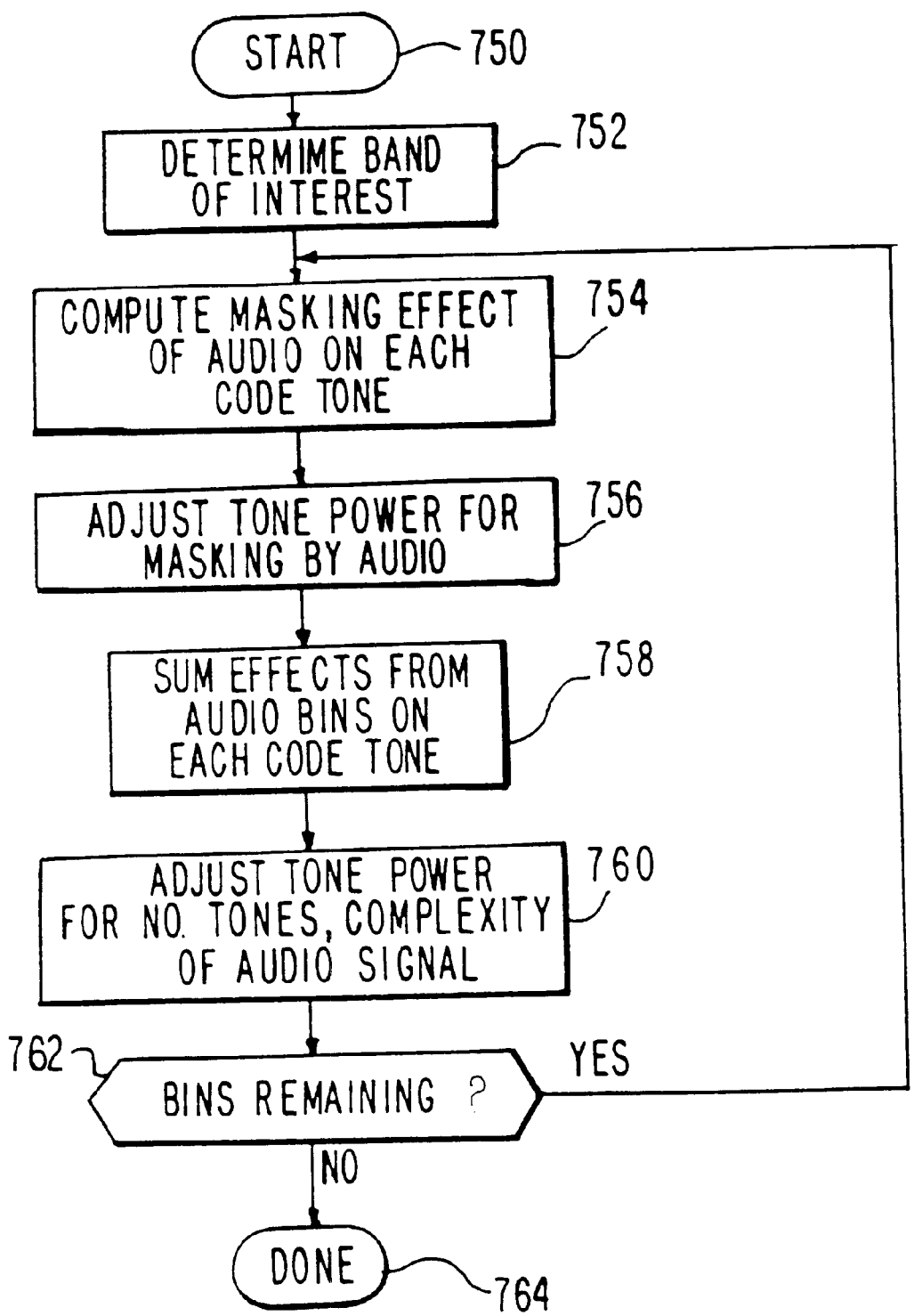

FIGS. 7D and 7E show flowcharts illustrating an implementation of the sliding tonal analysis technique for evaluating the masking effects of an audio signal. At step 702, variables are initialized such as the size in samples of a large FFT and a smaller FFT, the number of smaller FFTs per large FFT and the number of code tones per symbol, for example, 2048, 256, 8 and 10, respectively.

At steps 704–708, a number of samples corresponding to a large FFT is analyzed. At step 704, audio signal samples are obtained. At step 706, the power of the program material in each FFT bin is obtained. At step 708, the permissible code tone power in each corresponding FFT bin, accounting for the effects of all of the relevant audio signal tones on that bin, is obtained, for each of the tones. The flowchart of FIG. 7E shows step 708 in more detail.

At steps 710–712, a number of samples corresponding to a smaller FFT is analyzed, in similar fashion to steps 706–708 for a large FFT. At step 714, the permissible code powers found from the large FFT in step 708 and the smaller FFT in step 712 are merged for the portion of the samples which have undergone a smaller FFT. At step 716, the code tones are mixed with the audio signal to form encoded audio, and at step 718, the encoded audio is output to DAC 140. At step 720, it is decided whether to repeat steps 710–718, that is, whether there are portions of audio signal samples which have undergone a large FFT but not a smaller FFT. Then, at step 722, if there are any more audio samples, a next number of samples corresponding to a large FFT is analyzed.

FIG. 7E provides detail for steps 708 and 712, computing the permissible code power in each FFT bin. Generally, this procedure models the audio signal as comprising a set of tones (see examples below), computes the masking effect of each audio signal tone on each code tone, sums the masking effects and adjusts for the density of code tones and complexity of the audio signal.

At step 752, the band of interest is determined. For example, let the bandwidth used for encoding be 800 Hz–3200 Hz, and the sampling frequency be 44100 samples/sec. The starting bin begins at 800 Hz, and the ending bin ends at 3200 Hz.

Figure 7F:
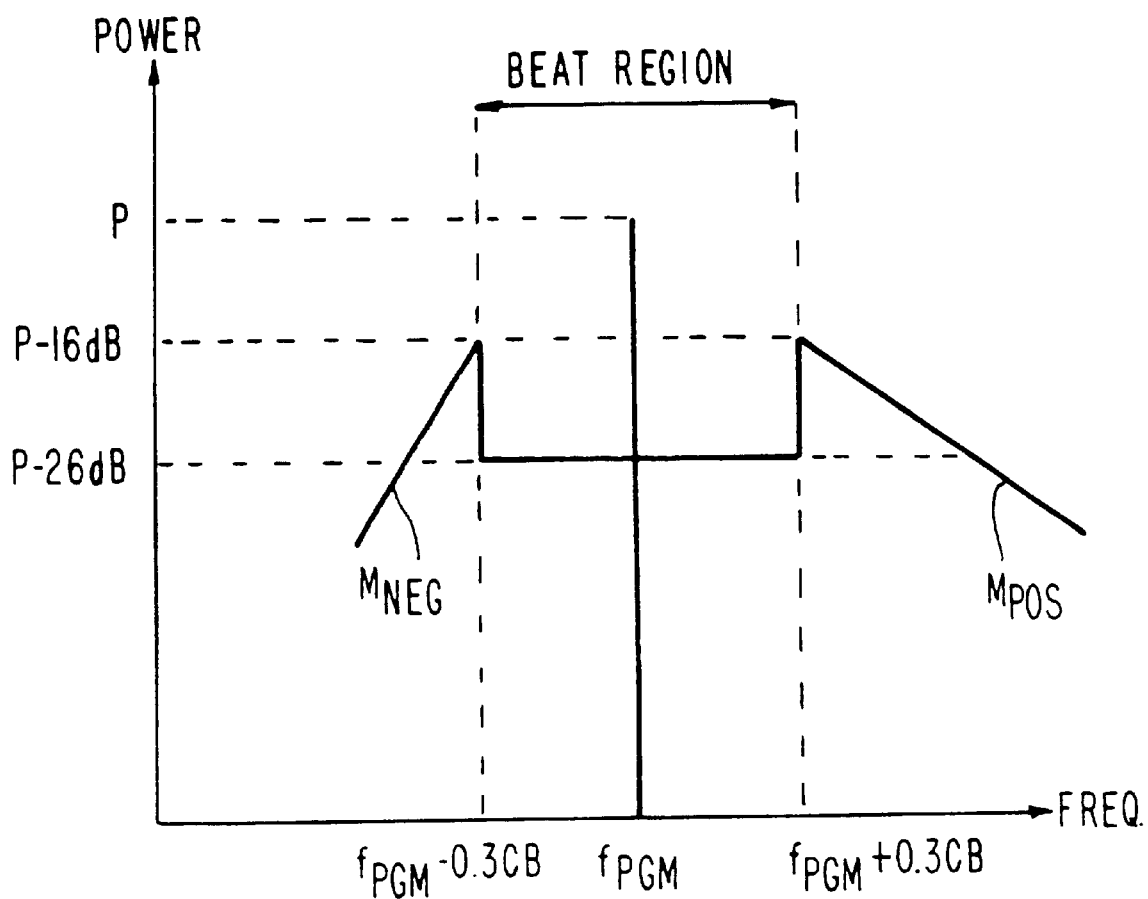
FIG. 7F is a graph showing a linear approximation of a single tone masking relationship.

At step 754, the masking effect of each relevant audio signal tone on each code in this bin is determined using the masking curve for a single tone, and compensating for the non-zero audio signal FFT bin width by determining (1) a first masking value based on the assumption that all of the audio signal power is at the upper end of the bin, and (2) a second masking value based on the assumption that all of the audio signal power is at the lower end of the bin, and then choosing that one of the first and second masking values which is smaller FIG. 7F shows an approximation of a single tone masking curve for an audio signal tone at a frequency of fPGM which is about 2200 Hz in this example, following Zwislocki, J. J., "Masking: Experimental and Theoretical Aspects of Simultaneous, Forward, Backward and Central Masking", 1978, in Zwicker et al., ed., *Psychoacoustics: Facts and Models*, pages 283–316, Springer-Verlag, New York. The width of the critical band (CB) is defined by Zwislocki as:

$$\text{critical band} = 0.002 * f_{PGM}^{1.5} + 100$$

With the following definitions, and letting "masker" be the audio signal tone,

BRKPOINT=0.3/+/−0.3 critical bands/
PEAKFAC=0.025119/−16 db from masker/
BEATFAC=0.002512/−26 db from masker/
mNEG=−2.40/−24 db per critical band/
mPOS=−0.70/−7 db per critical band/
cf=code frequency
mf=masker frequency
cband=critical band around $f_{PGM}$ then the masking factor, mfactor, can be computed as follows:

brkpt=cband*BRKPOINT
if on negative slope of curve of FIG. 7F,
  mfactor=PEAKFAC*10**(mNEG*mf-brkpt-cf)/cband)
if on flat part of curve of FIG. 7F,
  mfactor=BEATFAC
if on positive slope of curve of FIG. 7F,
  mfactor=PEAKFAC*10**(mPOS*cf-brkpt-mf)/cband)

Specifically, a first mfactor is computed based on the assumption that all of the audio signal power is at the lower end of its bin, then a second mfactor is computed assuming that all of the audio signal power is at the upper end of its bin, and the smaller of the first and second mfactors is chosen as the masking value provided by that audio signal tone for the selected code tone. At step 754, this processing is performed for each relevant audio signal tone for each code tone.

At step 756, each code tone is adjusted by each of the masking factors corresponding to the audio signal tones. In this embodiment, the masking factor is multiplied by the audio signal power in the relevant bin.

At step 758, the result of multiplying the masking factors by the audio signal power is summed for each bin, to provide an allowable power for each code tone.

At step 760, the allowable code tone powers are adjusted for the number of code tones within a critical bandwidth on either side of the code tone being evaluated, and for the complexity of the audio signal. The number of code tones within the critical band, CTSUM, is counted. The adjustment factor, ADJFAC, is given by:

$$ADJFAC = GLOBAL*(PSUM/PRSS)^{1.5}/CTSUM$$

where GLOBAL is a derating factor accounting for encoder inaccuracy due to time delays in FFT performance, $(PSUM/PRSS)^{1.5}$ is an empirical complexity correction factor, and 1/CTSUM represents simply dividing the audio signal power over all the code tones it is to mask. PSUM is the sum of the masking tone power levels assigned to the masking of the code tone whose ADJFAC is being determined. The root sum of squares power (PRSS) is given by $$PRSS = SQRT\left(\sum_i (P_i^2)\right), i = FFT \text{ bins in band}$$

For example, assuming a total masking tone power in a band equally spread among one, two and three tones, then

| no. tones | tone power | PSUM | PRSS |
|---|---|---|---|
| 1 | 10 | 1 * 10 = 10 | 10 |
| 2 | 5, 5 | 2 * 5 = 10 | SQRT $(2*5^2)$ = 7.07 |
| 3 | 3.3, 3.3, 3.3 | 3 * 3.3 = 10 | SQRT $(3*3.3^2)$ = 5.77 |

Thus, PRSS measures masking power peakiness (increasing values) or spread-out-ness (decreasing values) of the program material.

At step 762 of FIG. 7E, it is determined whether there are any more bins in the band of interest, and if so, they are processed as described above.

Examples of masking calculations will now be provided. An audio signal symbol at 0 dB is assumed, so that the values provided are the maximum code tone powers relative to the audio signal power. Four cases are provided: a single 2500 Hz tone; three tones at 2000, 2500 and 3000 Hz; narrow band noise modelled as 75 tones within the critical band centered at 2600, that is, 75 tones equally spaced at 5 Hz in the 2415 to 2785 Hz range; and broadband noise modelled as 351 tones equally spaced at 5 Hz in the 1750 to 3250 Hz range. For each case, a sliding tonal analysis (STA) calculated result is compared with the calculated result of selecting the best of the single tone, narrow band noise and wideband noise analyses.

| code tone (Hz) | SINGLE TONE | | MULTIPLE TONES | | NARROW BAND NOISE | | BROAD BAND NOISE | |
|---|---|---|---|---|---|---|---|---|
| | STA (dB) | BEST OF 3 (dB) | STA (dB) | BEST OF 3 (dB) | STA (dB) | BEST OF 3 (dB) | STA (dB) | BEST OF 3 (dB) |
| 1976 | −50 | −49 | −28 | −30 | −19 | NA | 14 | 12 |
| 2070 | −45 | −45 | −22 | −32 | −14 | NA | 13 | 12 |
| 2163 | −40 | −39 | −29 | −25 | −9 | NA | 13 | 12 |
| 2257 | −34 | −33 | −28 | −28 | −3 | NA | 12 | 12 |
| 2351 | −28 | −27 | −20 | −28 | 1 | NA | 12 | 12 |
| 2444 | −34 | −34 | −23 | −33 | 2 | 7 | 13 | 12 |
| 2538 | −34 | −34 | −24 | −34 | 3 | 7 | 13 | 12 |
| 2632 | −24 | −24 | −18 | −24 | 5 | 7 | 14 | 12 |
| 2726 | −26 | −26 | −21 | −26 | 5 | 7 | 14 | 12 |
| 2819 | −27 | −27 | −22 | −27 | 6 | NA | 15 | 12 |

For example, in the sliding tonal analysis (STA) for the single tone case, the masking tone is 2500 Hz, corresponding to a critical bandwidth of $0.002*2500^{1.5}+100=350$ Hz. The breakpoints for the curve of FIG. 7F are at 2500±0.3*350 or 2395 and 2605 Hz. The code frequency of 1976 is seen to be on the negative slope portion of the curve of FIG. 7F, so the masking factor is:

$$m\text{factor} = 0.025119*10^{-2.4*(2500-105-1976)/350}$$

$$= 3.364*10^{-5}$$

$$= -44.7 \text{ dB}$$

There are three codes tones within the critical band of 1976 Hz, so the masking power is split among them:

$$3.364*10^{-5}/3 = -49.5 \text{ dB}$$

This result is rounded to the −50 dB shown in the upper left of the sample calculations table.

In the "Best of 3" analysis, tonal masking is calculated according to the single tone method explained above in conjunction with FIG. 7F.

In the "Best of 3" analysis, narrow band noise masking is calculated by first computing the average power across a critical band centered on the frequency of the code tone of interest. Tonals with power greater than the average power are not considered as part of the noise and are removed. The summation of the remaining power is the narrow band noise power. The maximum allowable code tone power is −6 dB of the narrow band noise power for all code tones within a critical bandwidth of the code tone of interest.

In the "Best of 3" analysis, broadband noise masking is calculated by calculating the narrow band noise power for critical bands centered at 2000, 2280, 2600 and 2970 Hz. The minimum resulting narrow band noise power is multiplied by the ratio of the total bandwidth to the appropriate critical bandwidth to find the broadband noise power. For example, if the 2600 Hz centered band having a 370 Hz critical bandwidth is the minimum, its narrow band noise power is multiplied by 1322 Hz/370 Hz=3.57 to produce the broadband noise power. The allowed code tone power is −3 dB of the broadband noise power. When there are ten code tones, the maximum power allowed for each is 10 dB less, or −13 dB of the broadband noise power.

The sliding tonal analysis calculations are seen to generally correspond to the "Best of 3" calculations, indicating that the sliding tonal analysis is a robust method. Additionally, the results provided by the sliding tonal analysis in the case of multiple tones are better, that is, allow larger code tone powers, than in the "Best of 3" analysis, indicating that the sliding tonal analysis is suitable even for cases which do not fit neatly into one of the "Best of 3" calculations.

Figure 8:
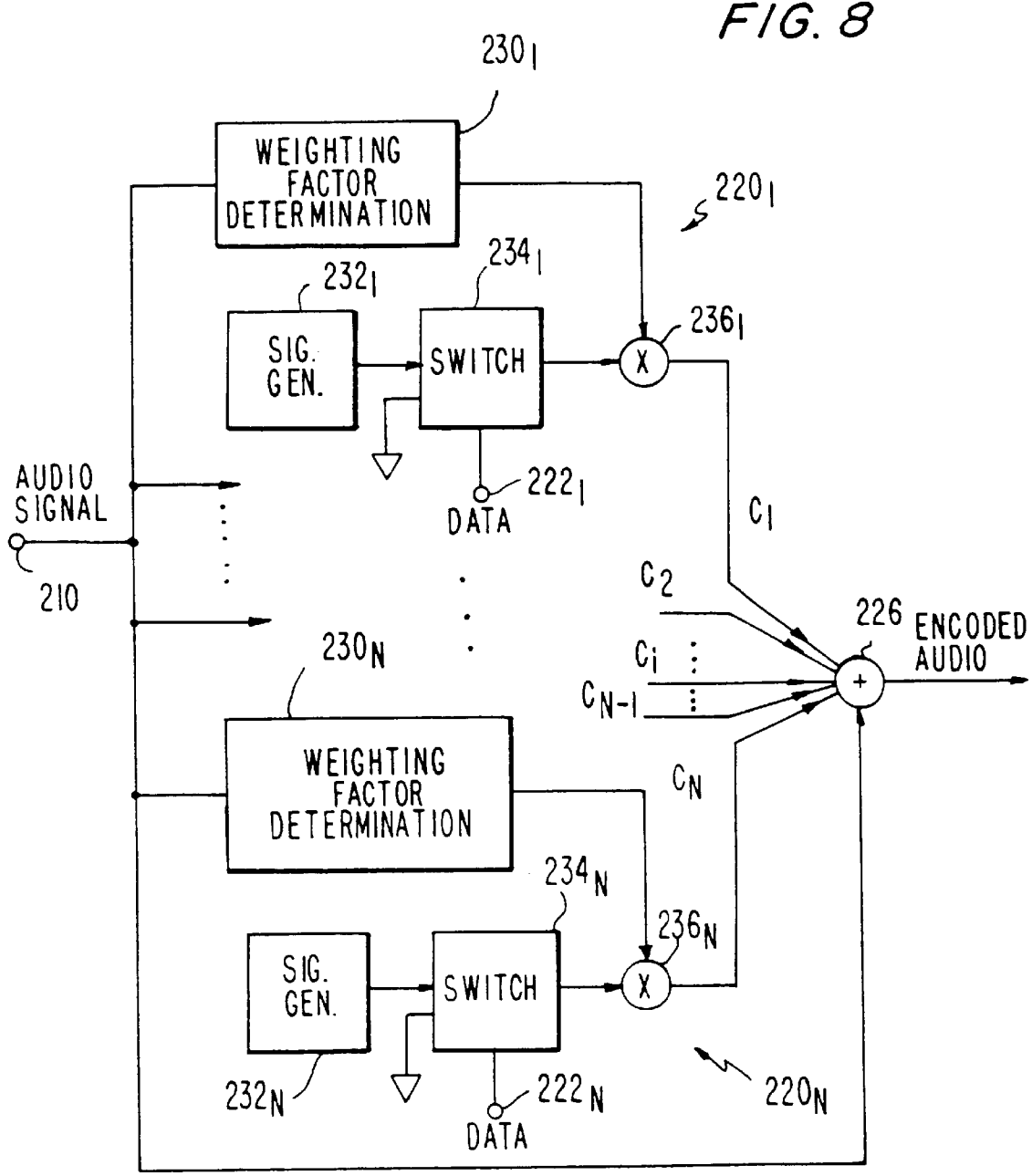
FIG. 8 is a block diagram of an encoder employing analog circuitry.

Referring now to FIG. 8, an embodiment of an encoder which employs analog circuitry is shown in block form therein. The analog encoder receives an audio signal in analog form at an input terminal 210 from which the audio signal is supplied as an input to N component generator circuits $220_1$ through $220_N$ each of which generates a respective code component $C_1$ through $C_N$. For simplicity and clarity only component generator circuits $220_1$ and $220_N$ are shown in FIG. 8. In order to controllably generate the code components of a respective data symbol to be included in the audio signal to form an encoded audio signal, each of the component generator circuits is supplied with a respective data input terminal $222_1$ through $222_N$ which serves as an enabling input for its respective component generator circuit. Each symbol is encoded as a subset of the code components $C_1$ through $C_N$ by selectably applying an enabling signal to certain ones of the component generator circuits $220_1$ through $220_N$. The generated code components corresponding with each data symbol are supplied as inputs to a summing circuit 226 which receives the input audio signal from the input terminal 210 at a further input, and serves to add the code components to the input audio signal to produce the encoded audio signal which it supplies at an output thereof.

Each of the component generator circuits is similar in construction and includes a respective weighting factor determination circuit $230_1$ through $230_N$, a respective signal generator $232_1$ through $232_N$, and a respective switching circuit $234_1$ through $234_N$. Each of the signal generators $232_1$ through $232_N$ produces a respectively different code component frequency and supplies the generated component to the respective switching circuit $234_1$ through $234_N$, each of which has a second input coupled to ground and an output coupled with an input of a respective one of multiplying circuits $236_1$ through $236_N$. In response to receipt of an enabling input at its respective data input terminal $222_1$ through $222_N$, each of the switching circuits $234_1$ through $234_N$ responds by coupling the output of its respective signal generator $232_1$ through $232_N$ to the input of the corresponding one of multiplying circuits $236_1$ through $236_N$. However, in the absence of an enabling signal at the data input, each switching circuit $234_1$ through $234_N$ couples its output to the grounded input so that the output of the corresponding multiplier $236_1$ through $236_N$ is at a zero level.

Figure 9:
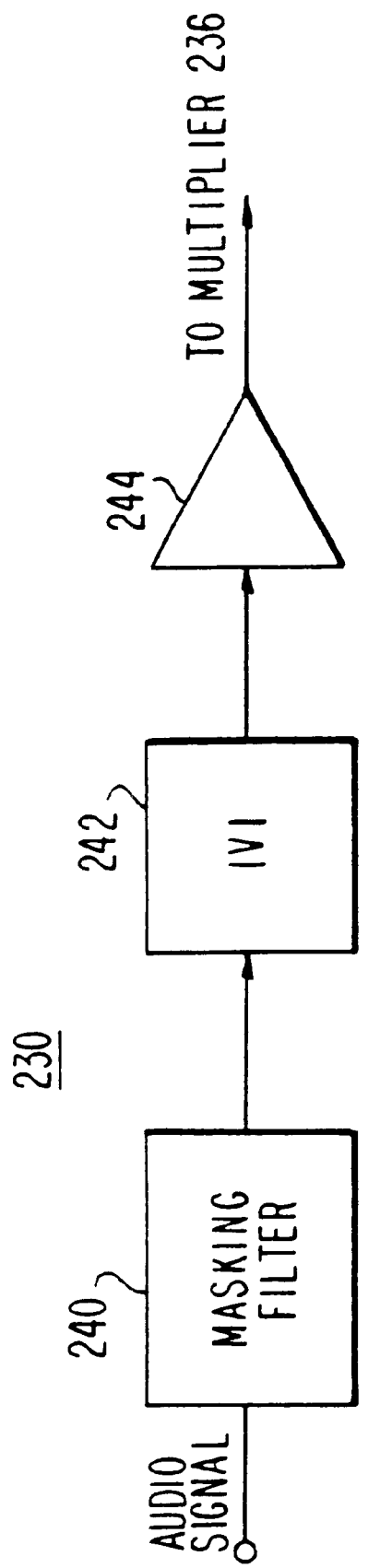
FIG. 9 is a block diagram of a weighting factor determination circuit of the embodiment of FIG. 8.

Each weighting factor determination circuit $230_1$ through $230_N$ serves to evaluate the ability of frequency components of the audio signal within a corresponding frequency band thereof to mask the code component produced by the corresponding generator $232_1$ to $232_N$ to produce a weighting factor which it supplies as an input to the corresponding multiplying circuit $236_1$ through $236_N$ in order to adjust the amplitude of the corresponding code component to ensure that it will be masked by the portion of the audio signal which has been evaluated by the weighting factor determination circuit. With reference also to FIG. 9, the construction of each of the weighting factor determination circuits $230_1$ through $230_N$, indicated as an exemplary circuit 230, is illustrated in block form. The circuit 230 includes a masking filter 240 which receives the audio signal at an input thereof and serves to separate the portion of the audio signal which is to be used to produce a weighting factor to be supplied to the respective one of the multipliers $236_1$ through $236_N$. The characteristics of the masking filter, moreover, are selected to weight the amplitudes of the audio signal frequency components according to their relative abilities to mask the respective code component.

The portion of the audio signal selected by the masking filter 240 is supplied to an absolute value circuit 242 which produces an output representing an absolute value of a portion of the signal within the frequency band passed by the masking filter 240. The output of the absolute value circuit 242 is supplied as an input to a scaling amplifier 244 having a gain selected to produce an output signal which, when multiplied by the output of the corresponding switch $234_1$ through $234_N$, will produce a code component at the output of the corresponding multiplier $236_1$ through $236_N$ which will ensure that the multiplied code component will be masked by the selected portion of the audio signal passed by the masking filter 240 when the encoded audio signal is reproduced as sound. Each weighting factor determination circuit $230_1$ through $230_N$, therefore, produces a signal representing an evaluation of the ability of the selected portion of the audio signal to mask the corresponding code component.

In other embodiments of analog encoders in accordance with the present invention, multiple weighting factor determination circuits are supplied for each code component generator, and each of the multiple weighting factor determination circuits corresponding to a given code component evaluates the ability of a different portion of the audio signal to mask that particular component when the encoded audio signal is reproduced as sound. For example, a plurality of such weighting factor determination circuits may be supplied each of which evaluates the ability of a portion of the audio signal within a relatively narrow frequency band (such that audio signal energy within such band will in all likelihood consist of a single frequency component) to mask the respective code component when the encoded audio is reproduced as sound. A further weighting factor determination circuit may also be supplied for the same respective code component for evaluating the ability of audio signal energy within a critical band having the code component frequency as a center frequency to mask the code component when the encoded audio signal is reproduced as sound. In addition, although the various elements of the FIGS. 8 and 9 embodiment are implemented by analog circuits, it will be appreciated that the same functions carried out by such analog circuits may also be implemented, in whole or in part, by digital circuitry.

Decoding

Figure 10:
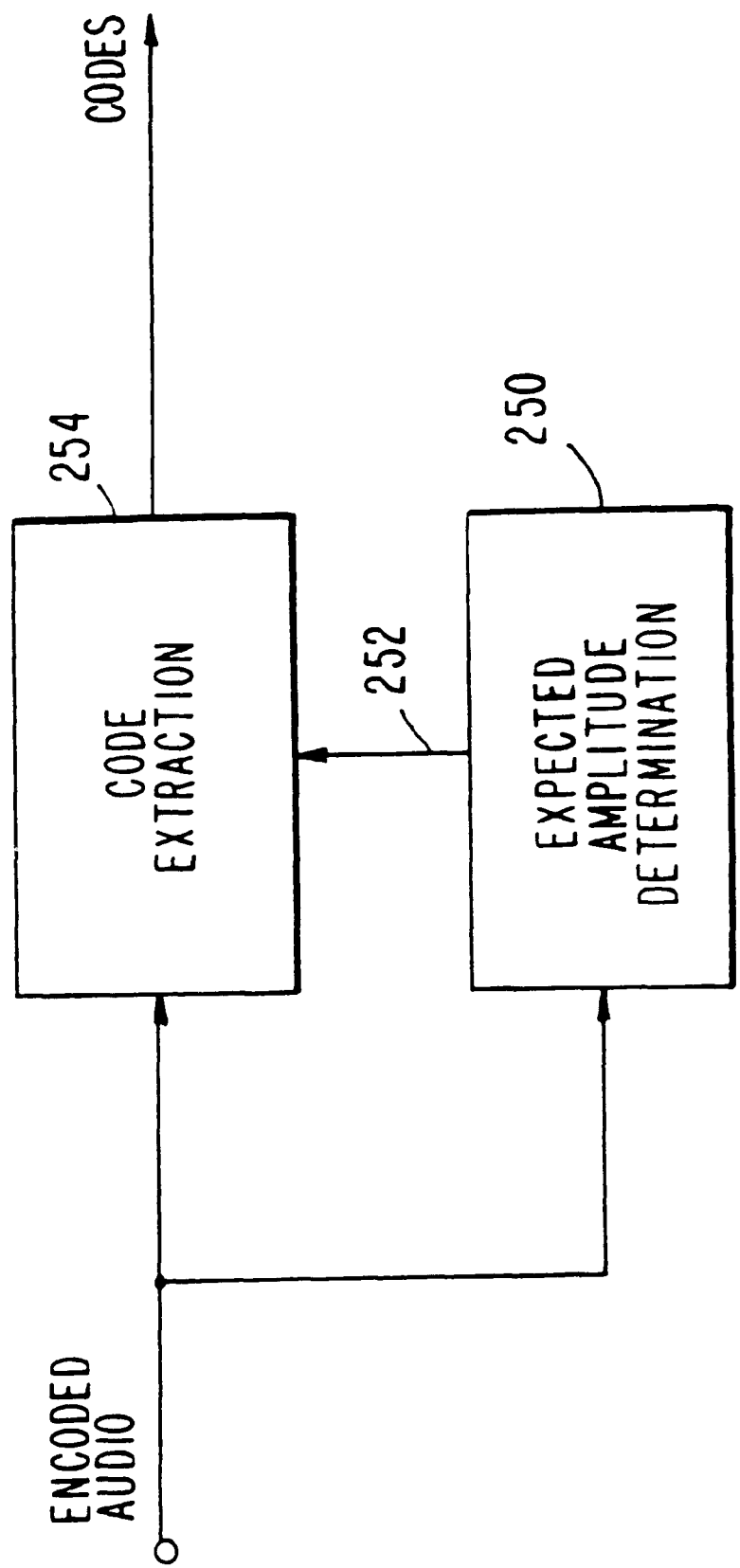
FIG. 10 is a functional block diagram of a decoder in accordance with certain features of the present invention.

Decoders and decoding methods which are especially adapted for decoding audio signals encoded by the inventive techniques disclosed hereinabove, as well as generally for decoding codes included in audio signals such that the codes may be distinguished therefrom based on amplitude, will now be described. In accordance with certain features of the present invention, and with reference to the functional block diagram of FIG. 10, the presence of one or more code components in an encoded audio signal is detected by establishing an expected amplitude or amplitudes for the one or more code components based on either or both of the audio signal level and a non-audio signal noise level as indicated by the functional block 250. One or more signals representing such expected amplitude or amplitudes are supplied, as at 252 in FIG. 10, for determining the presence of the code component by detecting a signal corresponding to the expected amplitude or amplitudes as indicated by the functional block 254. Decoders in accordance with the present invention are particularly well adapted for detecting the presence of code components which are masked by other components of the audio signal since the amplitude relationship between the code components and the other audio signal components is, to some extent, predetermined.

Figure 11:
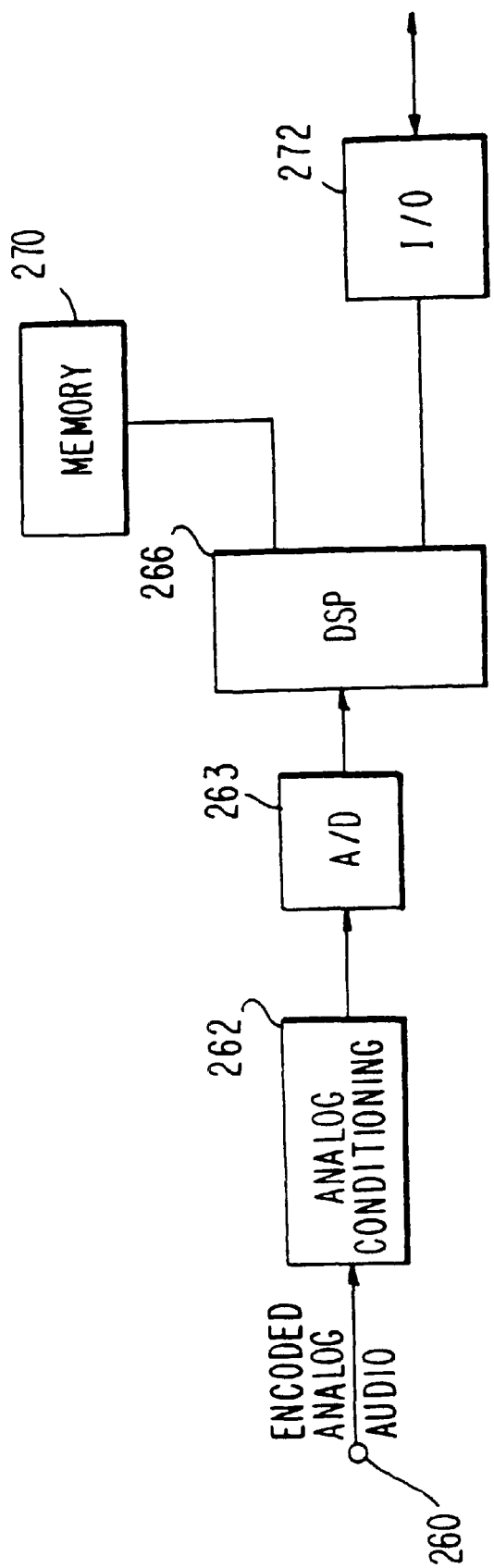
FIG. 11 is a block diagram of a decoder in accordance with an embodiment of the present invention employing digital signal processing.

FIG. 11 is a block diagram of a decoder in accordance with an embodiment of the present invention which employs digital signal processing for extracting codes from encoded audio signals received by the decoder in analog form. The decoder of FIG. 11L has an input terminal 260 for receiving the encoded analog audio signal which may be, for example, a signal picked up by a microphone and including television or radio broadcasts reproduced as sound by a receiver, or else such encoded analog audio signals provided in the form of electrical signals directly from such a receiver. Such encoded analog audio may also be produced by reproducing a sound recording such as a compact disk or tape cassette. Analog conditioning circuits 262 are coupled with the input 260 to receive the encoded analog audio and serve to carry out signal amplification, automatic gain control and anti-aliasing low-pass filtering prior to analog-to-digital conversion. In addition, the analog conditioning circuits 262 serve to carry out a bandpass filtering operation to ensure that the signals output thereby are limited to a range of frequencies in which the code components can appear. The analog conditioning circuits 262 output the processed analog audio signals to an analog-to-digital converter (A/D) 263 which converts the received signals to digital form and supplies the same to a digital signal processor (DSP) 266 which processes the digitized analog signals to detect the presence of code components and determines the code symbols they represent. The digital signal processor 266 is coupled with a memory 270 (comprising both program and data storage memories) and with input/output (I/O) circuits 272 to receive external commands (for example, a command to initiate decoding or a command to output stored codes) and to output decoded messages.

The operation of the digital decoder of FIG. 11 to decode audio signals encoded by means of the apparatus of FIG. 3 will now be described. The analog conditioning circuits 262 serve to bandpass filter the encoded audio signals with a passband extending from approximately 1.5 kHz to 3.1 kHz and the DSP 266 samples the filtered analog signals at an appropriately high rate. The digitized audio signal is then separated by the DSP 266 into frequency component ranges or bins by FFT processing. More specifically, an overlapping, windowed FFT is carried out on a predetermined number of the most recent data points, so that a new FFT is performed periodically upon receipt of a sufficient number of new samples. The data are weighted as discussed below and the FFT is performed to produce a predetermined number of frequency bins each having a predetermined width. The energy B(i) of each frequency bin in a range encompassing the code component frequencies is computed by the DSP 266.

A noise level estimate is carried out around each bin in which a code component can occur. Accordingly, where the decoder of FIG. 11 is used to decode signals encoded by the embodiment of FIG. 3, there are 40 frequency bins within which a code component can appear. For each such frequency bin a noise level is estimated as follows. First, an average energy E(j) in the frequency bins within a window extending in frequency above and below the particular frequency bin of interest j (that is, the bin in which the code component can appear) is computed in accordance with the following relationship:

$$E(j) = \frac{1}{2w+1} \sum B(i),$$

where i=(j−w)→(j+w) and w represents the extent of the window and below the bin of interest in numbers of bins. Then a noise level NS(j) in the frequency bin j is estimated in accordance with the following formula:

$$NS(j) = (\Sigma Bn(i))/(\Sigma \delta(i))$$

where Bn(i) equals B(i) (the energy level in bin i) if <EB(ji)and B(i) equals zero otherwise, and δ(i) equals 1 if B(i)<E(j) and δ(i) equals zero otherwise. That is, noise components are assumed to include those components having a level less than the average energy level within the particular window surrounding the bin of interest, and thus include audio signal components which fall below such average energy level.

Once the noise level for the bin of interest has been estimated, a signal-to-noise ratio for that bin SNR(j) is estimated by dividing the energy level B(j) in the bin of interest by the estimated noise level NS(j). The values of SNR(j) are employed both to detect the presence and timing of synchronization symbols as well as the states of data symbols, as discussed below. Various techniques may be employed to eliminate audio signal components from consideration as code components on a statistical basis. For example, it can be assumed that the bin having the highest signal to noise ratio includes an audio signal component. Another possibility is to exclude those bins having an SNR(j) above a predetermined value. Yet another possibility is to eliminate from consideration those bins having the highest and/or the lowest SNR(j).

When used to detect the presence of codes in audio signals encoded by means of the apparatus of FIG. 3, the apparatus of FIG. 11 accumulates data indicating the presence of code components in each of the bins of interest repeatedly for at least a major portion of the predetermined interval in which a code symbol can be found. Accordingly, the foregoing process is repeated multiple times and component presence data is accumulated for each bin of interest over that time frame. Techniques for establishing appropriate detection time frames based on the use of synchronization codes will be discussed in greater detail hereinbelow. Once the DSP 266 has accumulated such data for the relevant time frame, it then determines which of the possible code signals was present in the audio signal in the manner discussed below. The DSP 266 then stores the detected code symbol in the memory 270 together with a time stamp for identifying the time at which the symbol was detected based on an internal clock signal of the DSP. Thereafter, in response to an appropriate command to the DSP 266 received via the I/O circuit 272, the DSP causes the memory 270 to output the stored code symbols and time stamps via the I/O circuits 272.

Figure 12A:
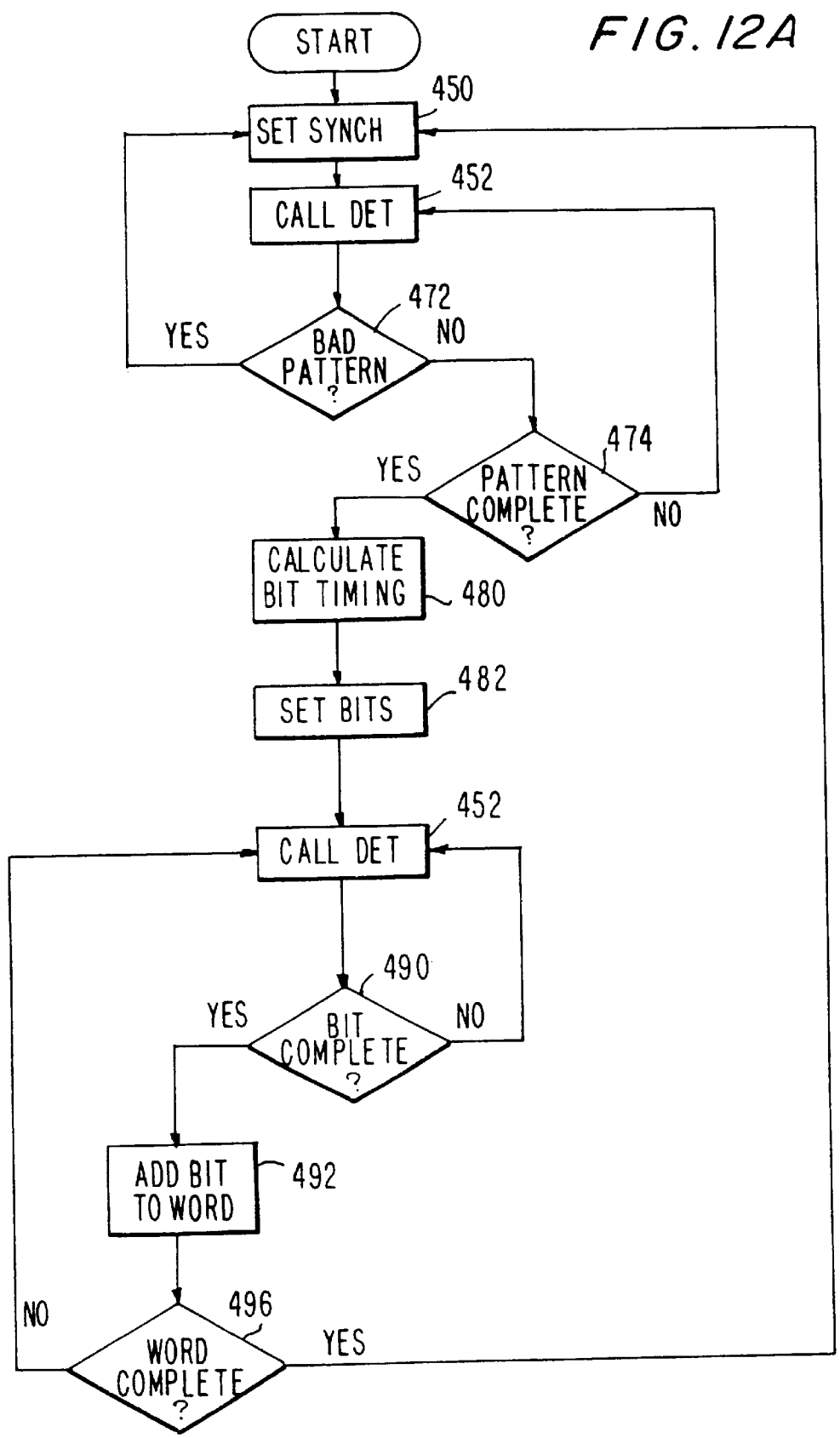
FIGS. 12A and 12B are flow charts for use in describing the operation of the decoder of FIG. 11.
Figure 12B:
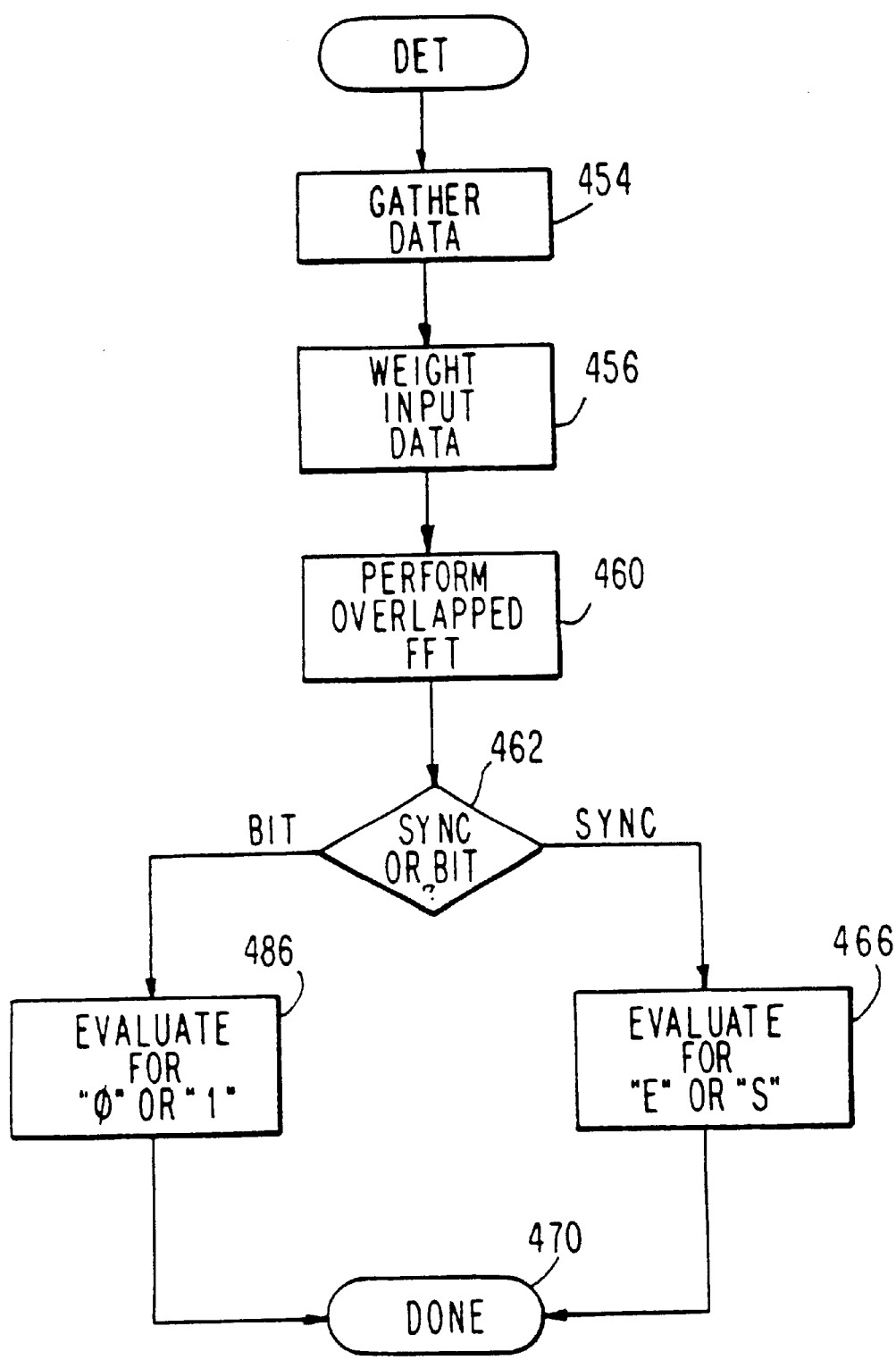

The flow charts of FIGS. 12A and 12B illustrate the sequence of operations carried out by the DSP 266 in decoding a symbol encoded in the analog audio signal received at the input terminal 260. With reference first to FIG. 12A, upon initiation of the decoding process, the DSP 266 enters a main program loop at a step 450 in which it sets a flag SYNCH so that the DSP 266 first commences an operation to detect the presence of the sync symbols E and S in the input audio signal in a predetermined message order. Once step 450 is carried out the DSP 266 calls a sub-routine DET, which is illustrated in the flow chart of FIG. 12B to search for the presence of code components representing the sync symbols in the audio signal.

Referring to FIG. 12B, in a step 454, the DSP gathers and stores samples of the input audio signal repeatedly until a sufficient number has been stored for carrying out the FFT described above. Once this has been accomplished, the stored data are subjected to a weighting function, such as a cosine squared weighting function, Kaiser-Bessel function, Gaussian (Poisson) function, Hanning function or other appropriate weighting function, as indicated by the step 456, for windowing the data. However, where the code components are sufficiently distinct, weighting is not required. The windowed data is then subjected to an overlapped FFT, as indicated by the step 460.

Once the FFT has been completed, in a step 462 the SYNCH flag is tested to see if it is set (in which case a sync symbol is expected) or reset (in which case a data bit symbol is expected). Since initially the DSP sets the SYNCH flag to detect the presence of code components representing sync symbols, the program progresses to a step 466 wherein the frequency domain data obtained by means of the FFT of step 460 is evaluated to determine whether such data indicates the presence of components representing an E sync symbol or an S sync symbol.

For the purpose of detecting the presence and timing of synchronization symbols, first the sum of the values of SNR(j) for each possible sync symbol and data symbol is determined. At a given time during the process of detecting synchronization symbols, a particular symbol will be expected. As a first step in detecting the expected symbol, it is determined whether the sum of its corresponding values SNR(j) is greater than any of the others. If so, then a detection threshold is established based upon the noise levels in the frequency bins which can contain code components. That is, since, at any given time, only one code symbol is included in the encoded audio signal, only one quarter of the bins of interest will contain code components. The remaining three quarters will contain noise, that is, program audio components and/or other extraneous energy. The detection threshold is produced as an average of the values SNR(j) for all forty of the frequency bins of interest, but can be adjusted by a multiplication factor to account for the effects of ambient noise and/or to compensate for an observed error rate.

When the detection threshold has thus been established, the sum of the values SNR(j) of the expected synchronization symbol is compared against the detection threshold to determine whether or not it is greater than the threshold. If so, a valid detection of the expected synchronization symbol is noted. Once this has been accomplished, as indicated by the step 470, the program returns to the main processing loop of FIG. 12A at a step 472 where it is determined (as explained hereinbelow) whether a pattern of the decoded data satisfies predetermined qualifying criteria. If not, processing returns to the step 450 to recommence a search for the presence of a sync symbol in the audio signal, but if such criteria are met, it is determined whether the expected sync pattern (that is, the expected sequence of symbols E and S) has been received in full and detected, as indicated by the step 474.

However, after the first pass through the sub-routine DET, insufficient data will have been gathered to determine if the pattern satisfies the qualifying criteria, so that from the step 474, processing returns to the sub-routine DET to carry out a further FFT and evaluation for the presence of a sync symbol. Once the sub-routine DET has been carried out a predetermined number of times, when processing returns to step 472 the DSP determines whether the accumulated data satisfies the qualifying criteria for a sync pattern.

That is, once DET has been carried out such predetermined number of times, a corresponding number of evaluations have been carried out in the step 466 of the sub-routine DET. The number of times an "E" symbol was found is used in one embodiment as a measure of the amount of "E" symbol energy during the corresponding time period. However, other measures of "E" symbol energy (such as the total of "E" bin SNR's which exceed the average bin energy) may instead be used. After the sub-routine DET is again called and a further evaluation is carried out in the step 466, in the step 472 this most recent evaluation is added to those accumulated during the predetermined interval and the oldest evaluation among those previously accumulated is discarded. This process continues during multiple passes through the DET sub-routine and in the step 472 a peak in the "E" symbol energy is sought. If such a peak is not found, this leads to a determination that a sync pattern has not been encountered, so that processing returns from the step 472 to the step 450 to set the SYNCH flag once again and recommence the search for a sync pattern.

If, however, such a maximum of the "E" signal energy has been found, the evaluation process carried out in the step 472 after the sub-routine DET 452 continues each time using the same number of evaluations from the step 466, but discarding the oldest evaluation and adding the newest, so that a sliding data window is employed for this purpose. As this process continues, after a predetermined number of passes in the step 472 it is determined whether a cross-over from the "E" symbol to the "S" has occurred. This is determined in one embodiment as the point where the total of "S" bin SNR's resulting from the step 466 within the sliding window first exceeds the total of "E" bin SNR's during the same interval. Once such a cross-over point has been found, processing continues in the manner described above to search for a maximum of the "S" symbol energy which is indicated by the greatest number of "S" detections within the sliding data window. If such a maximum is not found or else the maximum does not occur within an expected time frame after the maximum of the "E" symbol energy, processing proceeds from the step 472 back to the step 450 to recommence the search for a sync pattern.

If the foregoing criteria are satisfied, the presence of a sync pattern is declared in the step 474 and processing continues in the step 480 to determine the: expected bit intervals based on the "E" and "S" symbol energy maxima and the detected cross-over point. Instead of the foregoing process for detecting the presence of the sync pattern, other strategies may be adopted. In a further embodiment, a sync pattern which does not satisfy criteria such as those described above but which approximates a qualifying pattern (that is, the detected pattern is not clearly non-qualifying), a determination whether the sync pattern has been detected may be postponed pending further analysis based upon evaluations carried out (as explained hereinbelow) to determine the presence of data bits in expected data intervals following the potential sync pattern. Based on the totality of the detected data, that is, both during the suspected sync pattern interval and during the suspected bit intervals, a retrospective qualification of the possible sync pattern may be carried out.

Returning to the flow chart of FIG. 12A, once the sync pattern has been qualified, in the step 480, as noted above, the bit timing is determined based upon the two maxima and the crossover point. That is, these values are averaged to determine the expected start and end points of each subsequent data bit interval. Once this has been accomplished, in a step 482 the SYNCH flag is reset to indicate that the DSP will then search for the presence of either possible bit state. Then the sub-routine DET 452 is again called and, with reference to FIG. 12B as well, the sub-routine is carried out in the same fashion as described above until the step 462 wherein the state of the SYNCH flag indicates that a bit state should be determined and processing proceeds then to a step 486. In the step 486, the DSP searches for the presence of code components indicating either a zero bit state or a one bit state in the manner described hereinabove.

Once this has been accomplished, at the step 470 processing returns to the main processing loop of FIG. 12A in a step 490 where it is determined whether sufficient data has been received to determine the bit state. To do so, multiple passes must be made through the sub-routine 452, SO that after the first pass, processing returns to the sub-routine DET 452 to carry out a further evaluation based on a new FFT. Once the sub-routine 452 has been carried out a predetermined number of times, in the step 486 the data thus gathered is evaluated to determine whether the received data indicates either a zero state, a one state or an indeterminate state (which could be resolved with the use of parity data). That is, the total of the "0" bin SNR's is compared to the total of the "1" bin SNR's. Whichever is greater determines the data state, and if they are equal, the data state is indeterminate. In the alternative, if the "0" bin and "1" bin SNR totals are not equal but rather are close, an indeterminate data state may be declared. Also, if a greater number of data symbols are employed, that symbol for which the highest SNR summation is found is determined to be the received symbol.

When the processing again returns to the step 490, the determination of the bit state is detected and processing continues to a step 492 wherein the DSP stores data in the memory 270 indicating the state of the respective bit for assembling a word having a predetermined number of symbols represented by the encoded components in the received audio signal. Thereafter, in a step 496 it is determined whether the received data has provided all of the bits of the encoded word or message. If not, processing returns to the DET sub-routine 452 to determine the bit state of the next expected message symbol. However, if in the step 496 it is determined that the last symbol of the message has been received, processing returns to the step 450 to set the SYNCH flag to search for the presence of a new message by detecting the presence of its sync symbols as represented by the code components of the encoded audio signal.

Figure 13:
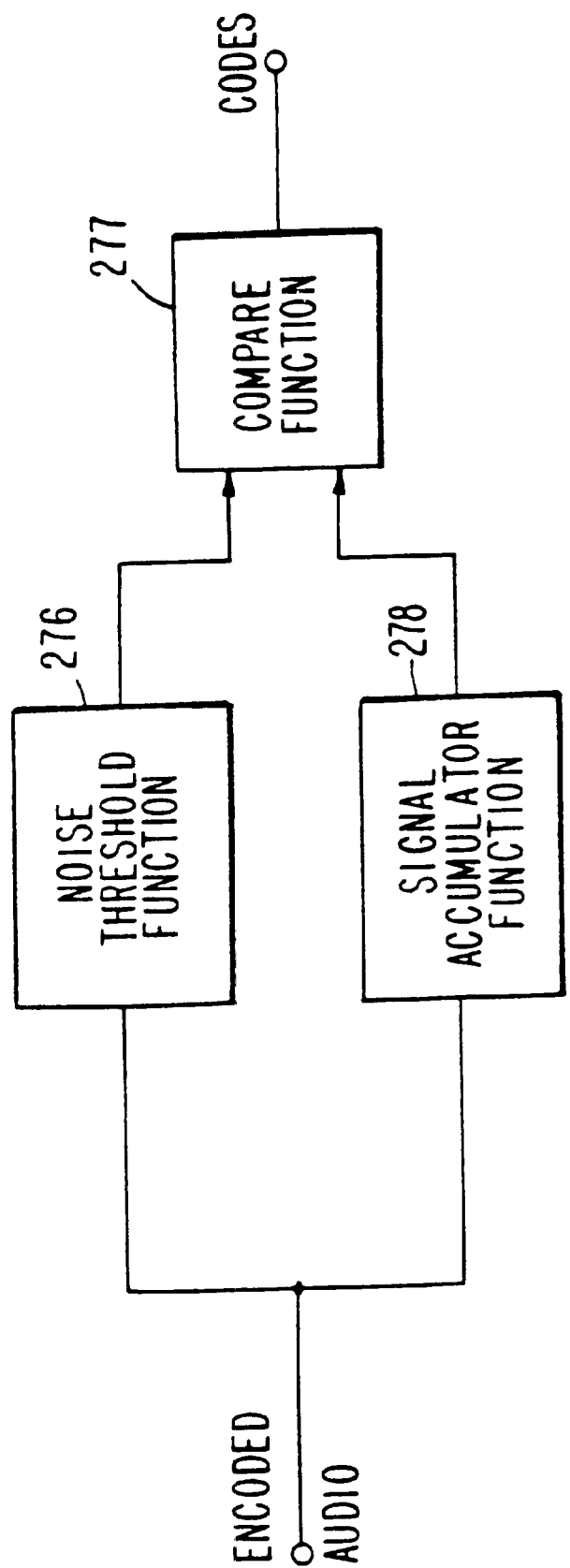
FIG. 13 is a functional block diagram of a decoder in accordance with certain embodiments of the present invention.

With reference to FIG. 13, in certain embodiments either or both of non-code audio signal components and other noise (collectively referred to in this context as "noise") are used to produce a comparison value, such as a threshold, as indicated by the functional block 276. One or more portions of the encoded audio signal are compared against the comparison value, as indicated by the functional block 277, to detect the presence of code components. Preferably, the encoded audio signal is first processed to isolate components within the frequency band or bands which may contain code components, and then these are accumulated over a period of time to average out noise, as indicated by the functional block 278.

Figure 14:
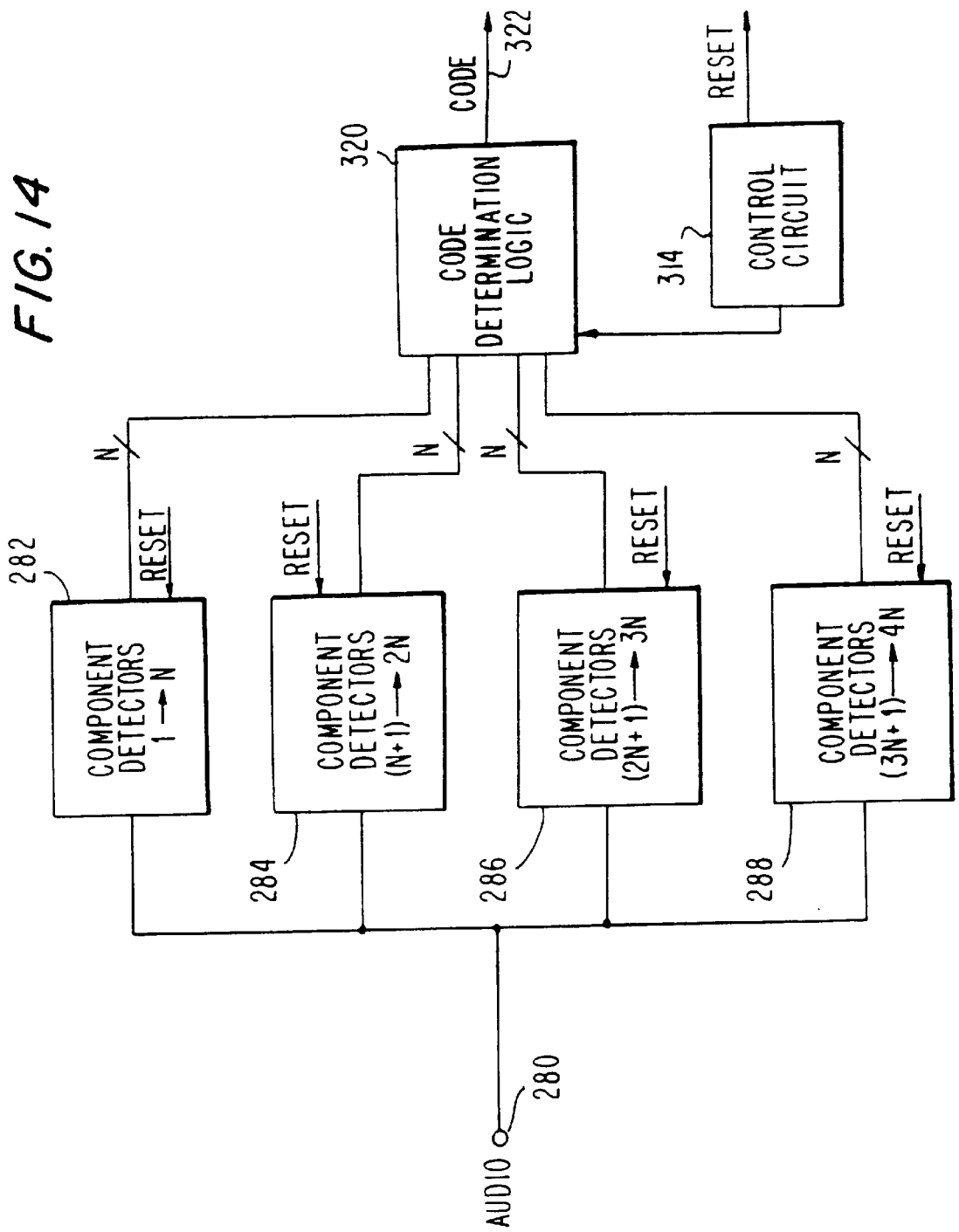
FIG. 14 is a block diagram of an embodiment of an analog decoder in accordance with the present invention.

Referring now to FIG. 14, an embodiment of an analog decoder in accordance with the present invention is illustrated in block format therein. The decoder of FIG. 14 includes an input terminal 280 which is coupled with four groups of component detectors 282, 284, 286 and 288. Each group of component detectors 282 through 288 serves to detect the presence of code components in the input audio signal representing a respective code symbol. In the embodiment of FIG. 14, the decoder apparatus is arranged to detect the presence of any of 4N code components, where N is an integer, such that the code is comprised of four different symbols each represented by a unique group of N code components. Accordingly, the four groups 282 through 288 include 4N component detectors.

Figure 15:
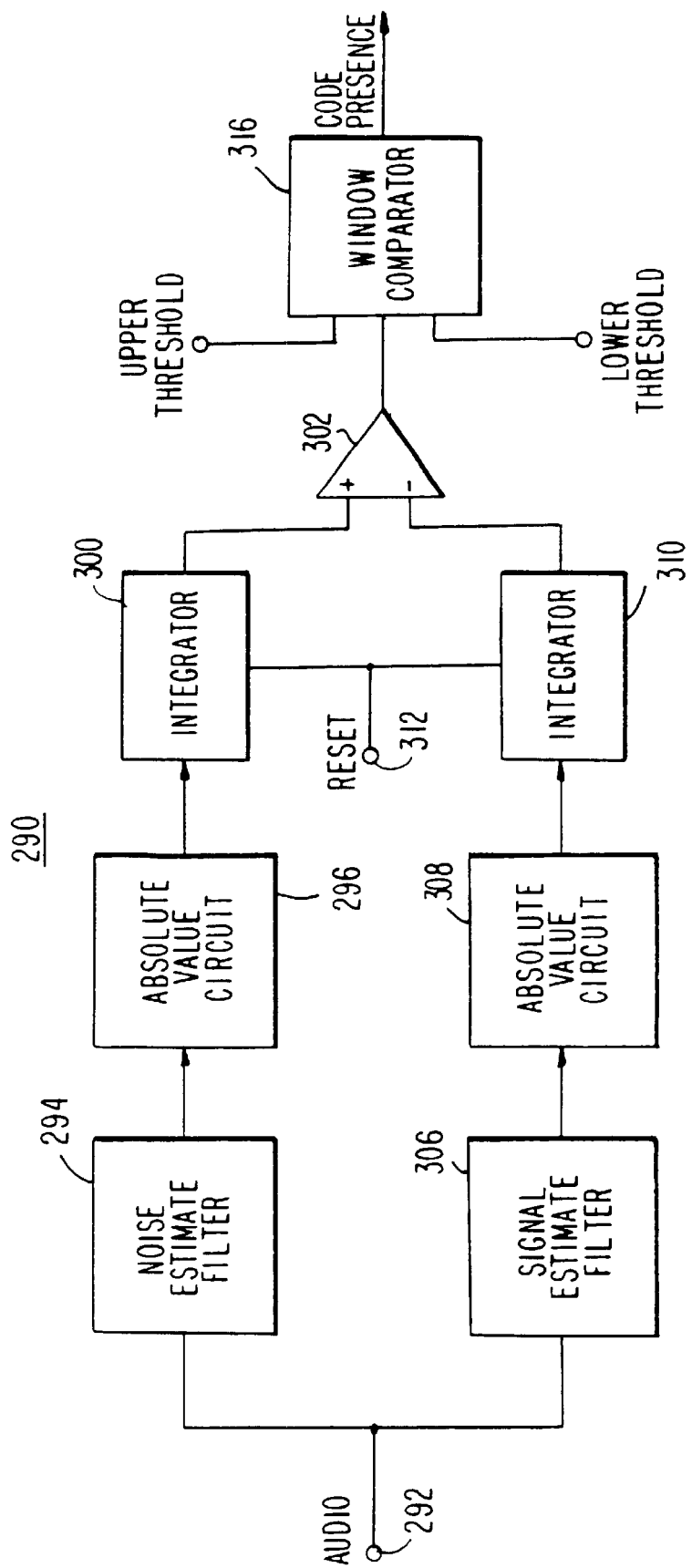
FIG. 15 is a block diagram of a component detector of the embodiment of FIG. 14.

An embodiment of one of the 4N component detectors of the groups 282 through 288 is illustrated in block format in FIG. 15 and is identified therein as the component detector 290. The component detector 290 has an input 292 coupled with the input 280 of the FIG. 14 decoder to receive the encoded audio signal. The component detector 290 includes an upper circuit branch having a noise estimate filter 294 which, in one embodiment, takes the form of a bandpass filter having a relatively wide passband to pass audio signal energy within a band centered on the frequency of the respective code component to be detected. In the alternative and preferably, the noise estimate filter 294 instead includes two filters, one of which has a passband extending from above the frequency of the respective code component to be detected and a second filter having a passband with an upper edge below the frequency of the code component to be detected, so that together the two filters pass energy having frequencies above and below (but not including) the frequency of the component to be detected, but within a frequency neighborhood thereof. An output of the noise estimate filter 294 is connected with an input of an absolute value circuit 296 which produces an output signal representing the absolute value of the output of the noise estimate filter 294 to the input of an integrator 300 which accumulates the signals input thereto to produce an output value representing signal energy within portions of the frequency spectrum adjacent to but not including the frequency of the component to be detected and outputs this value to a non-inverting input of a difference amplifier 302 which operates as a logarithmic amplifier.

The component detector of FIG. 15 also includes a lower branch including a signal estimate filter 306 having an input coupled with the input 292 to receive the encoded audio signal and serving to pass a band of frequencies substantially narrower than the relatively wide band of the noise estimate filter 294 so that the signal estimate filter 306 passes signal components substantially only at the frequency of the respective code signal component to be detected. The signal estimate filter 306 has an output coupled with an input of a further absolute value circuit 308 which serves to produce a signal at an output thereof representing an absolute value the signal passed by the signal estimate filter 306. The output of the absolute value circuit 308 is coupled with an input of a further integrator 310. The integrator 310 accumulates the values output by the circuit 308 to produce an output signal representing energy within the narrow pass band of the signal estimate filter for a predetermined period of time.

Each of integrators 300 and 310 has a reset terminal coupled to receive a common reset signal applied at a terminal 312. The reset signal is supplied by a control circuit 314 illustrated in FIG. 14 which produces the reset signal periodically.

Returning to FIG. 15, the output of the integrator 310 is supplied to an inverting input of the amplifier 302 which is operative to produce an output signal representing the difference between the output of the integrator 310 and that of the integrator 300. Since the amplifier 302 is a logarithmic amplifier, the range of possible output values is compressed to reduce the dynamic range of the output for application to a window comparator 316 to detect the presence or absence of a code component during a given interval as determined by the control circuit 314 through application of the reset signal. The window comparator outputs a code presence signal in the event that the input supplied from the amplifier 302 falls between a lower threshold applied as a fixed value to a lower threshold input terminal of the comparator 316 and a fixed upper threshold applied to an upper threshold input terminal of the comparator 316.

With reference again to FIG. 14, each of the N component detectors 290 of each component detector group couples the output of its respective window comparator 316 to an input of a code determination logic circuit 320. The circuit 320, under the control of the control circuit 314, accumulates the various code presence signals from the 4N component detector circuits 290 for a multiple number of reset cycles as established by the control circuit 314. Upon the termination of the interval for detection of a given symbol, established as described hereinbelow, the code determination logic circuit 320 determines which code symbol was received as that symbol for which the greatest number of components were detected during the interval and outputs a signal indicating the detected code symbol at an output terminal 322. The output signal may be stored in memory, assembled into a larger message or data file, transmitted or otherwise utilized (for example, as a control signal).

Symbol detection intervals for the decoders described above in connection with FIGS. 11, 12A, 12B, 14 and 15 may be established based on the timing of synchronization symbols transmitted with each encoded message and which have a predetermined duration and order. For example, an encoded message included in an audio signal may be comprised of two data intervals of the encoded E symbol followed by two data intervals of the encoded S symbol, both as described above in connection with FIG. 4. The decoders of FIGS. 11, 12A, 12B, 14 and 15 are operative initially to search for the presence of the first anticipated synchronization symbol, that is, the encoded E symbol which is transmitted during a predetermined period and determine its transmission interval. Thereafter, the decoders search for the presence of the code components characterizing the symbol S and, when it is detected, the decoders determine its transmission interval. From the detected transmission intervals, the point of transition from the E symbol to the S symbol is determined and, from this point, the detection intervals for each of the data bit symbols are set. During each detection interval, the decoder accumulates code components to determine the respective symbol transmitted during that interval in the manner described above.

Although various elements of the embodiment of FIGS. 14 and 15 are implemented by analog circuits, it will be appreciated that the same functions carried out thereby may also be implemented, in whole or in part, by digital circuitry.

Figure 16:
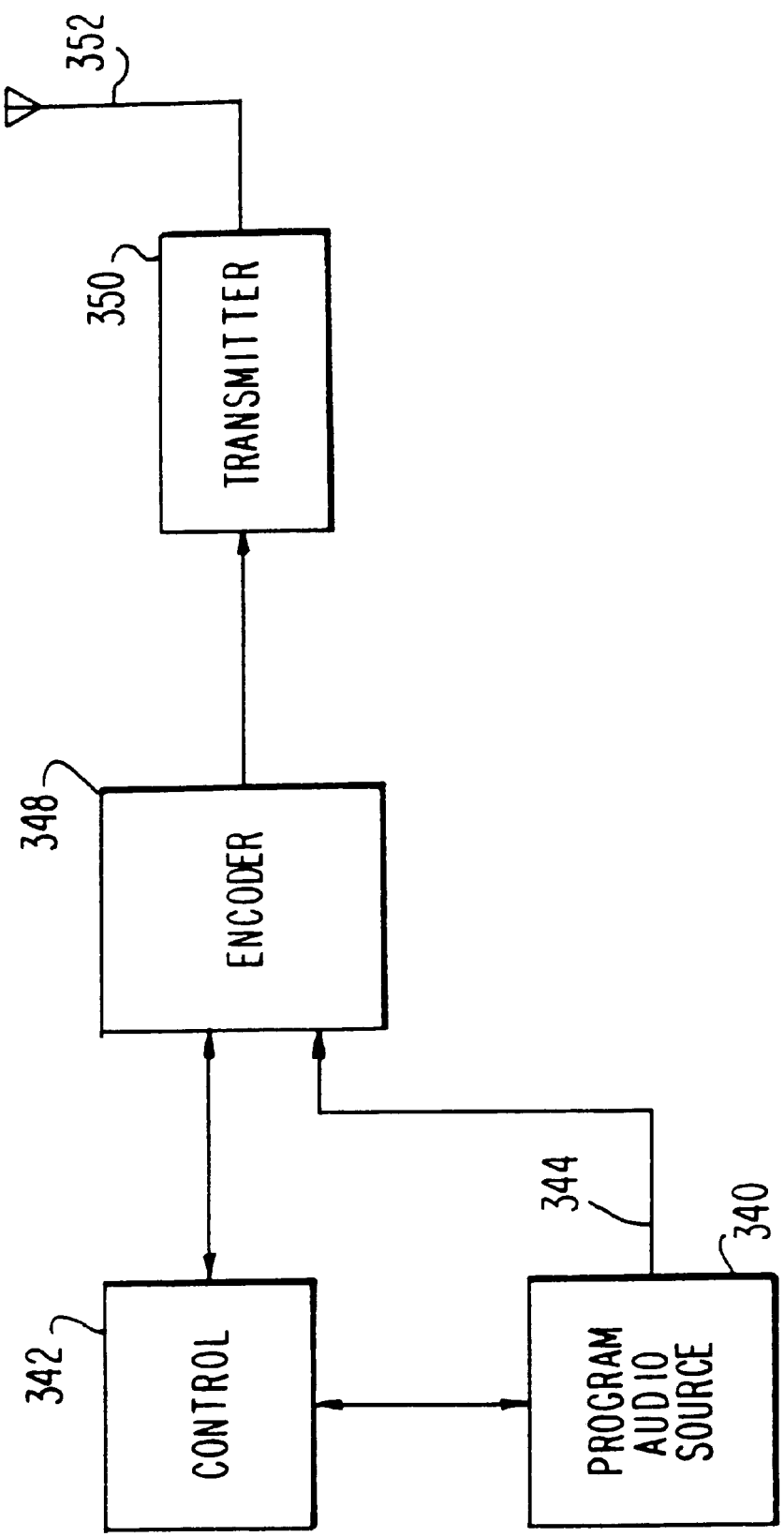

With reference now to FIGS. 16 and 17, a system is illustrated therein for producing estimates of audiences for widely disseminated information, such as television and radio programs. FIG. 16 is a block diagram of a radio broadcasting station for broadcasting audio signals over the air which have been encoded to identify the station together with a time of broadcast. If desired, the identity of a program or segment which is broadcast may also be included. A program audio source 340, such as a compact disk player, digital audio tape player, or live audio source is controlled by the station manager by means of control apparatus 342 to controllably output audio signals to be broadcast. An output 344 of the program audio source is coupled with an input of an encoder 348 in accordance with the embodiment of FIG. 3 and including the DSP 104, the bandpass filter 120, the analog-to-digital converter (A/D) 124, the digital-to-analog converter (DAC) 140 and summing circuit 142 thereof. The control apparatus 342 includes the host processor 90, keyboard 96 and monitor 100 of the FIG. 3 embodiment, so that the host processor included within the control apparatus 342 is coupled with the DSP included within the encoder 348 of FIG. 16. The encoder 348 is operative under the control of the control apparatus 342 to include an encoded message periodically in the audio to be transmitted, the message including appropriate identifying data. The encoder 348 output the encoded audio to the input of a radio transmitter 350 which modulates a carrier wave with the encoded program audio and transmits the same over the air by means of an antenna 352. The host processor included within the control apparatus 342 is programmed by means of the keyboard to control the encoder to output the appropriate encoded message including station identification data. The host processor automatically produces time of broadcast data by means of a reference clock circuit therein.

Referring also to FIG. 17, a personal monitoring device 380 of the system is enclosed by a housing 382 which is sufficiently small in size to be carried on the person of an audience member participating in an audience estimate survey. Each of a number of audience members is provided with a personal monitoring device, such as device 380, which is to be carried on the person of the audience member during specified times of each day during a survey period, such as a predetermined one week period. The personal monitoring device 330 includes an omnidirectional microphone 386 which picks up sounds that are available to the audience member carrying the device 380, including radio programs reproduced as sound by the speaker of a radio receiver, such as the radio receiver 390 in FIG. 17.

The personal monitoring device 380 also includes signal conditioning circuitry 394 having an input: coupled with an output of the microphone 386 and serving to amplify its output and subject the same to bandpass filtering both to attenuate frequencies outside of an audio frequency band including the various frequency components of the code included in the program audio by the encoder 348 of FIG. 16 as well as to carry out anti-aliasing filtering preliminary to analog-to-digital conversion.

Digital circuitry of the personal monitoring device 380 is illustrated in FIG. 17 in functional block diagram form including a decoder block and a control block both of which may be implemented, for example, by means of a digital signal processor. A program and data storage memory 404 is coupled both with the decoder 400 to receive detected codes for storage as well as with the control block 402 for controlling the writing and reading operations of the memory 404. An input/output (I/O) circuit 406 is coupled with the memory 404 to receive data to be output by the personal monitoring device 380 as well as to store information such as program instructions therein. The I/O circuit 406 is also coupled with the control block 402 for controlling input and output operations of the device 380.

The decoder 400 operates in accordance with the decoder of FIG. 11 described hereinabove and outputs station identification and time code data to be stored in the memory 404. The personal monitoring device 380 is also provided with a connector, indicated schematically at 410, to output accumulated station identification and time code data stored in the memory 404 as well as to receive commands from an external device.

The personal monitoring device 380 preferably is capable of opera ting with the docking station as disclosed in U.S. patent application Ser. No. 08/101,558 filed Aug. 2, 1993 entitled Compliance Incentives for Audience Monitoring/Recording Devices, which is commonly assigned with the present application and which is incorporated herein by reference. In addition, the personal monitoring device 380 preferably is provided with the additional features of the portable broadcast exposure monitoring device which is also disclosed in said U.S. Pat. application Ser. No. 08/101,558.

The docking station communicates via modem over telephone lines with a centralized data processing facility to upload the identification and time code data thereto to produce reports concerning audience viewing and/or listening. The centralized facility may also download information to the docking station for its use and/or for provision to the device 380, such as executable program information. The centralized facility may also supply information to the docking station and/or device 380 over an RF channel such as an existing FM broadcast encoded with such information in the manner of the present invention. The docking station and/or device 380 is provided with an FM receiver (not shown for purposes of simplicity and clarity) which demodulates the encoded FM broadcast to supply the same to a decoder in accordance with the present invention. The encoded FM broadcast can also be supplied via cable Dr other transmission medium.

In addition to monitoring by means of personal monitoring units, stationary units (such as set-top units) may be employed. The set-top units may be coupled to receive the encoded audio in electrical form from a receiver or else may employ a microphone such as microphone 386 of FIG. 17. The set-top units may then monitor channels selected, with or without also monitoring audience composition, with the use of the present invention.

Other applications are contemplated for the encoding and decoding techniques of the present invention. In one application, the sound tracks of commercials are provided with codes for identification to enable commercial monitoring to ensure that commercials have been transmitted (by television or radio broadcast, or otherwise) at agreed upon times.

In still other applications, control signals are transmitted in the form of codes produced in accordance with the present invention. In one such application, an interactive toy receives and decodes an encoded control signal included, in the audio portion of a television or radio broadcast or in a sound recording and carries out a responsive action. In another, parental control codes are included in audio portions of television or radio broadcasts or in sound recordings so that a receiving or reproducing device, by decoding such codes, can carry out a parental control function to selectively prevent reception or reproduction of broadcasts and recordings. Also, control codes may be included in cellular telephone transmissions to restrict unauthorized access to the uses of cellular telephone ID's. In another application, codes are included with telephone transmissions to distinguish voice and data transmissions to appropriately control the selection of a Transmission path to avoid corrupting transmitted data.

Various transmitter identification functions may also be implemented, for example, to ensure the authenticity of military transmissions and voice communications with aircraft. Monitoring applications are also contemplated. In one such application, participants in market research studies wear personal monitors which receive coded messages added to public address or similar audio signals at retail stores or shopping malls to record the presence of the participants. In another, employees wear personal monitors which receive coded messages added to audio signals in the workplace to monitor their presence at assigned locations.

Secure communications may also be implemented with the use of the encoding and decoding techniques of the present invention. In one such application, secure underwater communications are carried out by means of encoding and decoding according to the present invention either by assigning code component levels so that the codes are masked by ambient underwater sounds or by a sound source originating at the location of the code transmitter. In another, secure paging transmissions are effected by including masked codes with other over-the-air audio signal transmissions to be received and decoded by a paging device.

The encoding and decoding techniques of the present invention also may be used to authenticate voice signatures. For example, in a telephone order application, a stored voice print may be compared with a live vocalization. As another example, data such as a security number and/or time of day can be encoded and combined with a voiced utterance, and then decoded and used to automatically control processing of the) voiced utterance. The encoding device in this scenario can be either an attachment to a telephone or other voice communications device or else a separate fixed unit used when the voiced utterance is stored directly, without being sent over telephone lines or otherwise. A further application is provision of an authentication code in a memory of a portable phone, so that the voice stream contains the authentication code, thereby enabling detection of unauthorized transmissions.

It is also possible to achieve better utilization of communications channel bandwidth by including data in voice or other audio transmissions. In one such application, data indicating readings of aircraft instruments are included with air-to-ground voice transmissions to apprise ground controllers of an aircraft's operational condition without the need for separate voice and data channels. Code levels are selected so that code components are masked by the voice transmissions so that interference therewith is avoided.

Tape pirating, the unauthorized copying of copyrighted works such as audio/video recordings and music can also be detected by encoding a unique identification number on the audio portion of each authorized copy by means of the encoding technique of the present invention. If the encoded identification number is detected from multiple copies, unauthorized copying is then evident.

A further application determines the programs which have been recorded with the use of a VCR incorporating a decoder in accordance with the invention. Video programs (such as entertainment programs, commercials, etc.) are encoded according to the present invention with an identification code identifying the program. When the VCR is placed in a recording mode, the audio portions of the signals being recorded are supplied to the decoder to detect the identification codes therein. The detected codes are stored in a memory of the VCR for subsequent use in generating a report of recording usage.

Data indicating the copyrighted works which have been broadcast by a station or otherwise transmitted by a provider can be gathered with the use of the present invention to ascertain liability for copyright royalties. The works are encoded with respective identification codes which uniquely identify them. A monitoring unit provided with the signals broadcast or otherwise transmitted by one or more stations or providers provides audio portions thereof to a decoder according to the present invention which detects the identification codes present therein. The detected codes are stored in a memory for use in generating a report to be used to assess royalty liabilities.

Proposed decoders according to the Motion Picture Experts Group (MPEG) 2 standard already include some elements of the acoustic expansion processing needed to extract encoded data according to the present invention, so recording inhibiting techniques (for example, to prevent unauthorized recording of copyrighted works) using codes according to the present invention are well suited for MPEG 2 decoders. An appropriate decoder according to the present invention is provided in the recorder or as an auxiliary thereto, and detects the presence of a copy inhibit code in audio supplied for recording. The recorder responds to the inhibit code thus detected to disable recording of the corresponding audio signal and any accompanying signals, such as a video signal. Copyright information encoded according to the present invention is in-band, does not require additional timing or synchronization, and naturally accompanies the program material.

In still further applications, programs transmitted over the air, cablecast or otherwise transmitted, or else programs recorded on tape, disk or otherwise, include audio portions encoded with control signals for use by one or more viewer or listener operated devices. For example, a program depicting the path a cyclist might travel includes an audio portion encoded according to the present invention with control signals for use by a stationary exercise bicycle for controlling pedal resistance or drag according to the apparent incline of the depicted path. As the user pedals the stationary bicycle, he or she views the program on a television or other monitor and the audio portion of the program is reproduced as sound. A microphone in the stationary bicycle transduces the reproduced sound and a decoder according to the present invention detects the control signals therein, providing the same to a pedal resistance control unit of the exercise bicycle.

From the foregoing it will be appreciated that the techniques of the present invention may be implemented in whole or in part using analog or digital circuitry and that all or part of the signal processing functions thereof may be carried out either by hardwired circuits or with the use of digital signal processors, microprocessors, microcomputers, multiple processors (for example, parallel processors), or the like.

Although specific embodiments of the invention have been disclosed in detail herein, it is to be understood that the invention is not limited to those precise embodiments, and that various modifications may be effected therein by one skilled in the art without departing from the scope or spirit of the invention as defined in the appended claims.

What is claimed is:

1. An apparatus for including a code having a plurality of audio signal frequency components, wherein the code comprises a plurality of code frequency component sets, each of the code frequency component sets representing a respectively different code symbol and including a plurality of respectively different code frequency components, the code frequency components of the code frequency component sets forming component clusters spaced from one another within the frequency domain, each of the component clusters having a respective predetermined frequency range and consisting of one frequency component from each of the code frequency component sets falling within its respective predetermined frequency range, component clusters which are adjacent within the frequency domain being separated by respective frequency amounts, wherein the predetermined frequency range of each respective component cluster is smaller than the frequency amounts separating the respective component cluster from its adjacent component clusters, the plurality of code frequency components including a first code frequency component having a first frequency and a second code frequency component having a second frequency different from the first frequency, comprising:

first masking evaluation means for evaluating a masking ability of at least one of the plurality of audio signal frequency components to mask a code frequency component having the first frequency to human hearing to produce a first respective masking evaluation;

second masking evaluation means for evaluating a masking ability of at least one of the plurality of audio signal frequency components to mask a code frequency component having the second frequency to human hearing to produce a second respective masking evaluation;

amplitude assigning means for assigning a respective amplitude to the first code frequency component based on the first respective masking evaluation and for assigning a respective amplitude to the second code frequency component based on the second respective masking evaluation; and code inclusion means for including the plurality of code frequency components with the audio signal.

2. A method for including a code having a plurality of code frequency components with an audio signal having a plurality of audio signal frequency components, the plurality of code frequency components including a first code frequency component having a first frequency and a second code frequency component having a second frequency different from the first frequency, comprising the steps of evaluating a masking ability of at least one of the plurality of audio signal frequency components to mask a code frequency component having the first frequency to human hearing to produce a first respective masking evaluation;

evaluating a masking ability of at least one of the plurality of audio signal frequency components to mask a code frequency component having the second frequency to human hearing to produce a second respective masking evaluation;

assigning a respective amplitude to the first code frequency component based on the first respective masking evaluation and a respective amplitude to the second code frequency component based on the second respective masking evaluation; and including the plurality of code frequency components with the audio signal.

3. The method of claim 2, further comprising the step of decoding the encoded audio signal to detect the first and second code frequency components.

4. The method of claim 2, further comprising the step of producing the first and second code frequency components in response to data representing at least one of a broadcast source, an audio and/or video program source and an audio and/or video program identification.

5. The method of claim 2, wherein the code comprises a plurality of code frequency component sets, each of the code frequency component sets representing a respectively different code symbol and including a plurality of respectively different code frequency components, the code frequency components of the code frequency component sets forming component clusters spaced from one another within the frequency domain, each of the component clusters having a respective predetermined frequency range and consisting of one frequency component from each of the code frequency component sets falling within its respective predetermined frequency range, component clusters which are adjacent within the frequency domain being separated by respective frequency amounts, and wherein the predetermined frequency range of each respective component cluster is smaller than the frequency amounts separating the respective component cluster from its adjacent component clusters.

6. The method of claim 2, wherein the step of evaluating the masking ability of at least one of the plurality of audio signal frequency components to mask a code frequency component having the first frequency includes detecting signal power of audio signal frequency components within a specified frequency range, determining first and second masking factors on the conditions that the signal power is at each of first and second frequencies, respectively, within the specified frequency range, the second frequency being different than the first frequency, selecting that one of the first and second masking factors which represents a smaller amplitude of the at least one code frequency component, and determining the masking ability of the at least one of the plurality of audio signal frequency components to mask a code frequency component having the first frequency based on the selected masking factor.

7. An apparatus for including a code having a plurality of code frequency components with an audio signal having a plurality of audio signal frequency components, the plurality of code frequency components including a first code frequency component having a first frequency and a second code frequency component having a second frequency different from the first frequency, comprising:

a digital computer having an input for receiving the audio signal, the digital computer being programmed to evaluate a masking ability of at least one of the plurality of audio signal frequency components to mask a code frequency component having the first frequency to human hearing to produce a first respective masking evaluation and to evaluate a masking ability of at least one of the plurality of audio signal frequency components to mask a code frequency component having the second frequency to human hearing to produce a second respective masking evaluation;

the digital computer being further programmed to assign a corresponding amplitude to the first code frequency component based on the first respective masking evaluation and to assign a corresponding amplitude to the second code frequency component based on the second respective masking evaluation;

the digital computer being programmed to produce the code as a plurality of code frequency component sets, each of the code frequency component sets representing a respectively different code symbol and including a plurality of respectively different code frequency components, the code frequency components of the code frequency component sets forming component clusters spaced from one another within the frequency domain, each of the component clusters having a respective predetermined frequency range and consisting of one frequency component from each of the code frequency component sets falling within its respective predetermined frequency range, component clusters which are adjacent within the frequency domain being separated by respective frequency amounts, and wherein the predetermined frequency range of each respective component cluster is smaller than the frequency amounts separating the respective component cluster from its adjacent component clusters; and means for including the plurality of code frequency components with the audio signal.

8. An apparatus for including a code having a plurality of code frequency components with an audio signal having a plurality of audio signal frequency components, the plurality of code frequency components including a first code frequency component having a first frequency and a second code frequency component having a second frequency different from the first frequency, comprising:

a digital computer having an input for receiving the audio signal, the digital computer being programmed to evaluate a masking ability of at least one of the plurality of audio signal frequency components to mask a code frequency component having the first frequency to human hearing by detecting a signal power of audio signal frequency components within a specified frequency range, to determine first and second masking factors with respect to the code frequency component having the first frequency on the conditions that the signal power is at each of first and second frequencies, respectively, within the specified frequency range, the second frequency being different than the first frequency, and to select that one of the first and second masking factors which represents a smaller amplitude of the at least one code frequency component to produce a first respective masking evaluation;

the digital computer being programmed to evaluate a masking ability of at least one of the plurality of audio signal frequency components to mask a code frequency component having the second frequency to human hearing to produce a second respective masking evaluation;

the digital computer being further programmed to assign a corresponding amplitude to the first code frequency component based or the first respective masking evaluation and to assign a corresponding amplitude to the second code frequency component based on the second respective masking evaluation; and means for including the plurality of code frequency components with the audio signal.

* * * * *

UNITED STATES PATENT AND TRADEMARK OFFICE
CERTIFICATE OF CORRECTION

PATENT NO.    : 6,421,445 B1
DATED         : July 16, 2002
INVENTOR(S)   : James M. Jensen It is certified that error appears in the above-identified patent and that said Letters Patent is hereby corrected as shown below:

Column 35,
Lines 39-40, cancel "1. An apparatus for including a code having a plurality of audio signal frequency components" and insert -- 1. An apparatus for including a code having a plurality of code frequency components with an audio signal having a plurality of audio signal frequency components --

Signed and Sealed this

Thirtieth Day of September, 2003

JAMES E. ROGAN
*Director of the United States Patent and Trademark Office*